US010067974B2

(12) United States Patent
Raja et al.

(10) Patent No.: US 10,067,974 B2
(45) Date of Patent: Sep. 4, 2018

(54) LOADING AND RELOADING AN IN-MEMORY COPY OF A DATABASE OBJECT WITHOUT BLOCKING CONCURRENT UPDATES TO THE DATABASE OBJECT

(71) Applicant: Oracle International Corporation, Redwood Shores, CA (US)

(72) Inventors: Vivekanandhan Raja, Foster City, CA (US); Atrayee Mullick, Santa Clara, CA (US); Sanket Hase, Mountain View, CA (US); Sukhada Pendse, Foster City, CA (US); Amit Ganesh, San Jose, CA (US); Vineet Marwah, San Ramon, CA (US); Neil MacNaughton, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 418 days.

(21) Appl. No.: 14/983,481

(22) Filed: Dec. 29, 2015

(65) Prior Publication Data

US 2016/0350363 A1 Dec. 1, 2016

Related U.S. Application Data

(60) Provisional application No. 62/168,681, filed on May 29, 2015.

(51) Int. Cl.
*G06F 17/30* (2006.01)
*G06F 3/06* (2006.01)

(52) U.S. Cl.
CPC ........ *G06F 17/30377* (2013.01); *G06F 3/065* (2013.01); *G06F 17/30353* (2013.01); *G06F 17/30362* (2013.01); *G06F 17/30371* (2013.01)

(58) Field of Classification Search
CPC .......................... G06F 17/30353; G06F 3/065
See application file for complete search history.

(56) References Cited

U.S. PATENT DOCUMENTS

| 4,782,325 A | 11/1988 | Jeppsson et al. |
| 5,742,792 A | 4/1998 | Yanai et al. |

(Continued)

FOREIGN PATENT DOCUMENTS

| EP | 2 608 070 A1 | 6/2013 |
| GB | 1 332 631 A | 10/1973 |
| WO | WO2007/078444 A1 | 7/2007 |

OTHER PUBLICATIONS

Shao et al., "Clotho: Decoupling Memory Page Layout from Storage Organization", Proceedings of the 30th VLDB Conference, Toronto, Canada, 2004, 12 pages.

(Continued)

*Primary Examiner* — William Spieler
(74) *Attorney, Agent, or Firm* — Hickman Palermo Becker Bingham LLP

(57) ABSTRACT

Techniques are herein described for loading a portion of a database object into volatile memory without blocking database manipulation language transactions. The techniques involve invalidating data items loaded from blocks affected by a transaction, referred to as a straddling transaction that started before the load time and committed after the load time. Identifying these straddling transactions involves reviewing one or more transaction lists associated with the set of data items loaded in memory. The transaction list may be read in reverse temporal order of commit to identify a transaction meeting the criteria of starting before the load start, not committing before the load time, and affecting a data item loaded in memory.

28 Claims, 14 Drawing Sheets

(56) References Cited

U.S. PATENT DOCUMENTS

| | | |
|---|---|---|
| 5,778,430 A | 7/1998 | Ish et al. |
| 5,870,759 A | 2/1999 | Bauer et al. |
| 6,009,432 A | 12/1999 | Tarin |
| 7,149,769 B2 | 12/2006 | Lubbers et al. |
| 7,647,329 B1 | 1/2010 | Fischman |
| 8,433,684 B2 | 4/2013 | Munoz |
| 8,856,484 B2 | 10/2014 | Ben-Tsion et al. |
| 9,292,564 B2 | 3/2016 | Kamp et al. |
| 9,396,202 B1 | 7/2016 | Drobychev |
| 2005/0055380 A1 | 3/2005 | Thompson et al. |
| 2005/0165798 A1 | 7/2005 | Cherkauer et al. |
| 2006/0173833 A1 | 8/2006 | Purcell et al. |
| 2007/0156957 A1 | 7/2007 | McHardy et al. |
| 2008/0059492 A1 | 3/2008 | Tarin |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0037495 A1 | 2/2009 | Kumar |
| 2009/0307290 A1 | 12/2009 | Barsness et al. |
| 2010/0235335 A1 | 9/2010 | Heman et al. |
| 2010/0250549 A1 | 9/2010 | Muller et al. |
| 2011/0029569 A1 | 2/2011 | Ganesh et al. |
| 2011/0099351 A1 | 4/2011 | Condict |
| 2011/0138123 A1 | 6/2011 | Aditya et al. |
| 2011/0196822 A1 | 8/2011 | Zunger |
| 2011/0196828 A1 | 8/2011 | Drobychev |
| 2011/0196833 A1 | 8/2011 | Drobychev |
| 2012/0078951 A1 | 3/2012 | Hsu |
| 2012/0173515 A1 | 7/2012 | Jeong et al. |
| 2012/0310916 A1 | 12/2012 | Abadi |
| 2012/0323971 A1 | 12/2012 | Pasupuleti |
| 2013/0060742 A1* | 3/2013 | Chang .............. G06F 17/30359 707/704 |
| 2013/0332590 A1 | 12/2013 | Mohaban |
| 2014/0040218 A1 | 2/2014 | Kimura et al. |
| 2014/0040237 A1 | 2/2014 | Chen |
| 2014/0075493 A1 | 3/2014 | Krishnan et al. |
| 2014/0149357 A1 | 5/2014 | Gupta |
| 2014/0372702 A1 | 12/2014 | Subramanyam |
| 2015/0006846 A1 | 1/2015 | Youngworth |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp et al. |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0100574 A1 | 4/2015 | Presta |
| 2015/0142733 A1 | 5/2015 | Shadmon |
| 2015/0261792 A1 | 9/2015 | Attarde |
| 2016/0026660 A1 | 1/2016 | Mukherjee et al. |
| 2016/0085834 A1 | 3/2016 | Gleeson et al. |
| 2016/0350352 A1 | 12/2016 | Hase et al. |
| 2017/0344593 A1 | 11/2017 | Mullick et al. |

OTHER PUBLICATIONS

Schaffner et al., "A Hybrid Row-Column OLTP Database Architecture for Operational Reporting", dated Aug. 24, 2008, 14 pages.

Ramamurthy, Ravishankar, "A Case for Fractured Mirrors" Proceedings of the 28th VLDB Conference, dated, 2002, 12 pages.

Phipps, Colin:, "Mapping Deflated Files", Internet Article, dated Jan. 6, 2013, http://zsync.moria.org.uk/paper/ch03s02.html, 3 pages.

Nirmesh, Malviya, "Recovery Algorithms for In-Memory OLTP Databases", Master of Science Thesis, dated Jul. 1, 2012, 66 pages.

Khalid Sayood:, "Introduction to data Compression", Morgan Kaufmann Publisher, dated Dec. 1996, 4 pages.

Farber et al., "SAP HANA Database—Data Management for Modern Business Applications", SIGMOD Record, dated Dec. 2011, vol. 40, No. 4, 8 pages.

U.S. Appl. No. 14/337,179, filed 074/21/2014, Notice of Allowance, dated Jul. 29, 2015.

U.S. Appl. No. 14/337,179, filed Jul. 21, 2014, Office Action, dated Dec. 29, 2014.

U.S. Appl. No. 14/337,179, filed Jul. 21, 2014, Notice of Allowance, dated Nov. 3, 2015.

U.S. Appl. No. 14/337,179, filed Jul. 21, 2014, Interview Summary, dated Jun. 17, 2015.

U.S. Appl. No. 14/334,179, filed Jul. 21, 2014, Final Office Acion, dated Apr. 10, 2015.

Zhang Ho et al., "In-Memory Big Data, Management and Processing: A Survery", IEEE, vol. 27, No. 7, dated Jul. 1, 2015, pp. 1920-1948.

Alfons Kemper et al., "Hyper: A Hybrid OLTP&OLAP Main Memory Database System Based on Virtual Memory Snapshots", Data Engineering (ICDE), dated Apr. 11, 2011, IEEE, pp. 195-206.

Mukherjee, U.S. Appl. No. 14/565,906, filed Dec. 10, 2014, Office Action, dated Feb. 2, 2017.

U.S. Appl. No. 14/565,906, filed Dec. 10, 2014, Final Office Action, dated Aug. 8, 2017.

Mukherjee, U.S. Appl. No. 14/565,906, filed Dec. 10, 2014, Notice of Allowance, dated Aug. 28, 2017.

Mukherjee, U.S. Appl. No. 14/565,906, filed Dec. 10, 2014, Office Action, dated May 31, 2017.

Wikipedia, "Readers-Writer Lock", https://en.wikipedia.org/w/index.php?tilte=Readers%E2%80%93writer_lock &oldid=657375918, dated 2015, 3 pages.

Hase, U.S. Appl. No. 14/983,496, filed Dec. 29, 2015, Office Action dated May 30, 2018.

\* cited by examiner

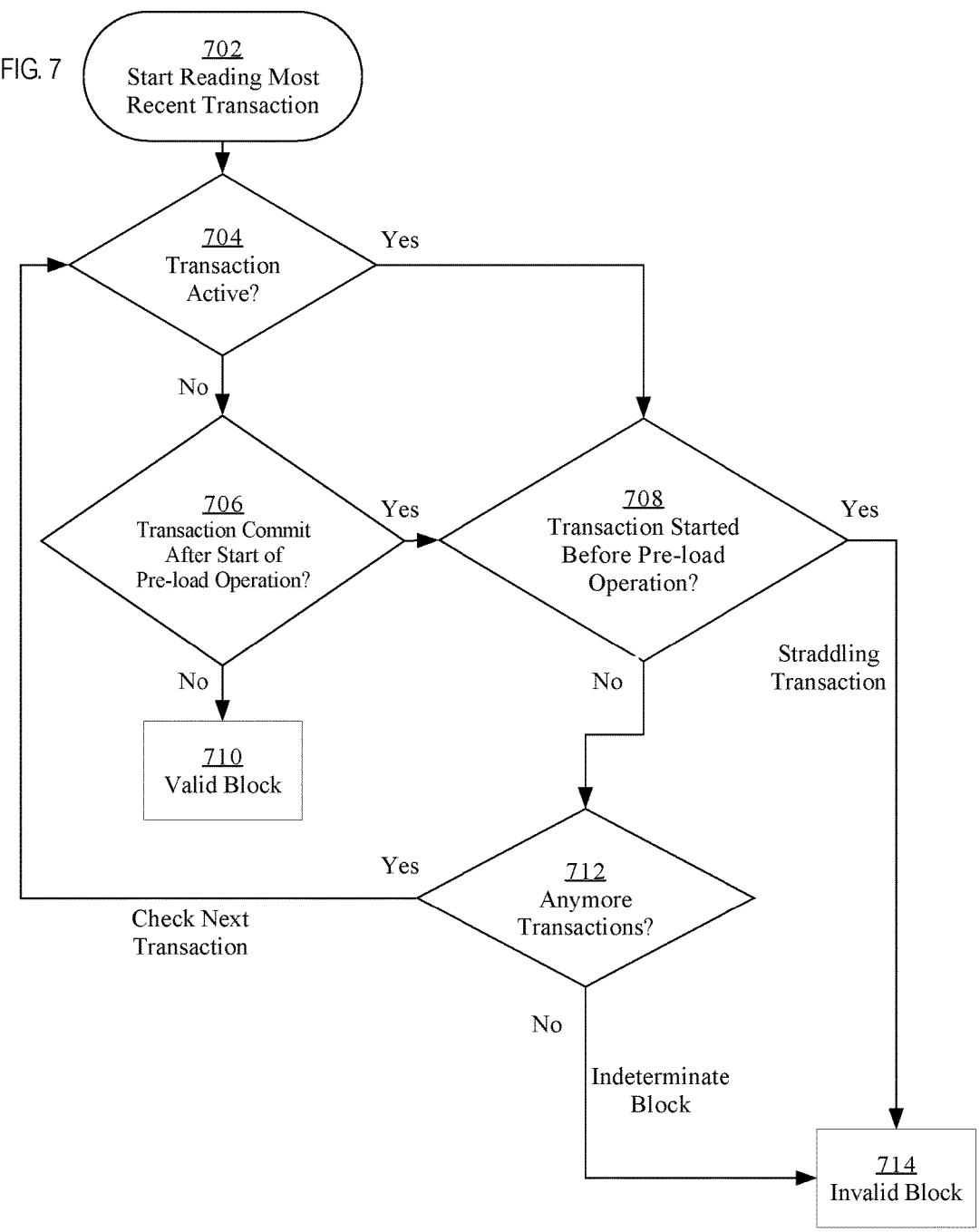

LOADING AND RELOADING AN IN-MEMORY COPY OF A DATABASE OBJECT WITHOUT BLOCKING CONCURRENT UPDATES TO THE DATABASE OBJECT

CROSS-REFERENCE TO RELATED APPLICATIONS; BENEFIT CLAIM

This application claims the benefit of Provisional Appln. 62/168,681, filed May 29, 2015, the entire contents of which is hereby incorporated by reference as if fully set forth herein, under 35 U.S.C. § 119(e).

FIELD OF THE INVENTION

The present invention relates to data storage and retrieval techniques in a database, and more specifically to improved computer-implemented techniques for loading an in-memory database object without blocking concurrent data manipulation language statements.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be pre-loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance", filed Jul. 21, 2014, referred to herein as the "Mirroring" application, the contents of which is incorporated herein in its entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. An in-memory version or copy of an object (or selected portions thereof), is referred to herein as an In-Memory-Copy (IMC). The set of data that is copied from disk into volatile memory to create an IMC is referred to herein as a "chunk".

In a database cluster, when one node in the cluster loads a chunk from disk into volatile memory, other nodes are prevented from making changes to the chunk to keep the data consistent within the IMC. This can be accomplished by having the node that is loading the chunk obtain an exclusive lock to lock the chunk before loading the chunk. The exclusive lock on the chunk can be released when the chunk has been fully loaded into volatile memory. While the chunk is momentarily locked during the pre-loading operation, data items from the chunk cannot be changed (such as created, updated, or deleted) through data manipulation language (DML) operations.

Unfortunately, for applications that require high volumes of DMLs, such as online transaction processing applications, locking entire chunks while the chunks are pre-loaded would cause the application to experience significant interruptions. Blocking DMLs from executing during chunk loading is an unacceptably high cost. On the other hand, granting DMLs a higher priority than chunk-loading may prevent the load operation from ever finishing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 7 is a flowchart illustrating how a database server scrutinizes the transaction list of a block that has data items used to generate and IMC.

DETAILED DESCRIPTION

Figure 1:
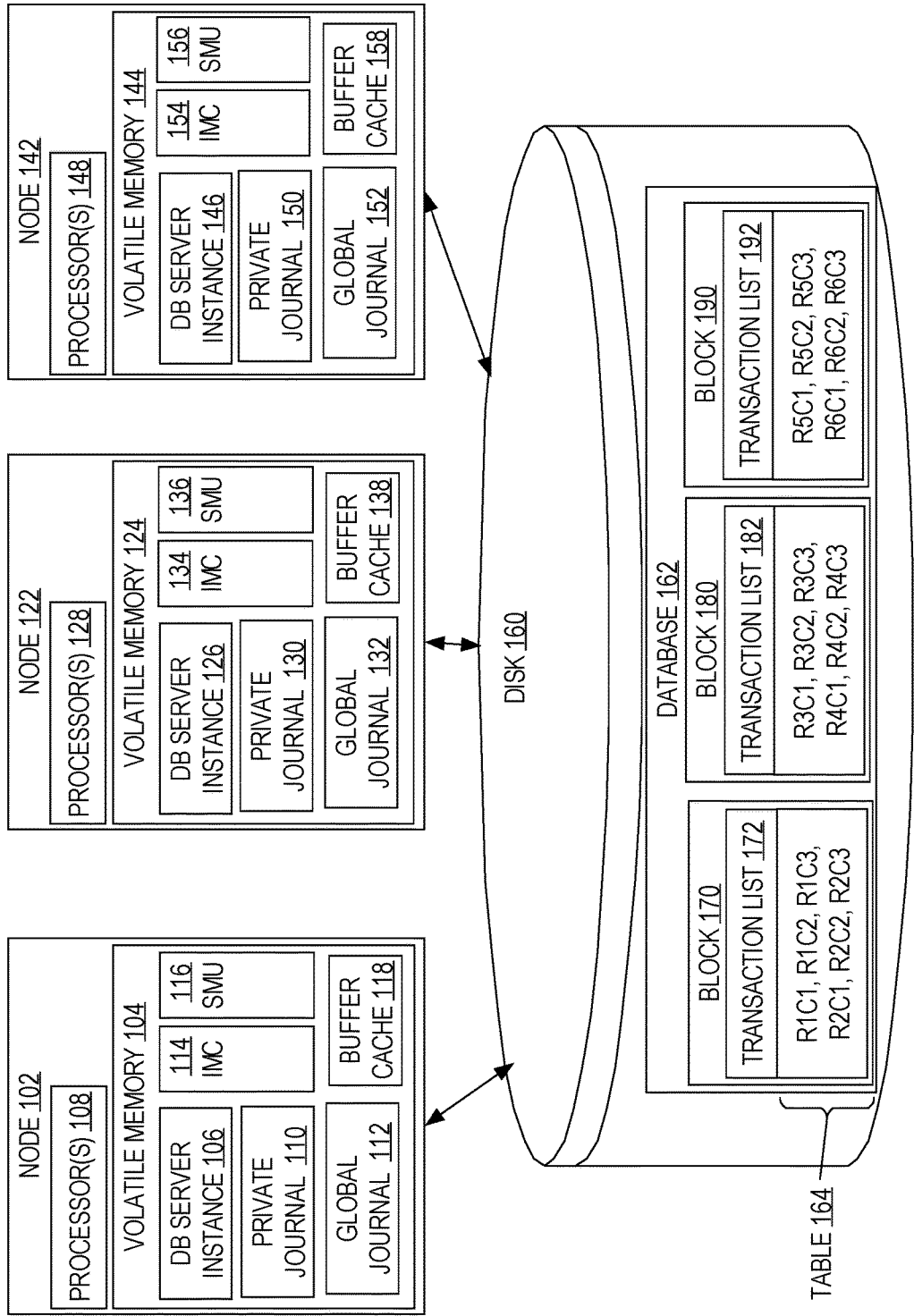
FIG. 1 is a block diagram illustrating a database system architecture of a database cluster.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are herein described for generating an IMC from a consistent version of a database object or portions thereof (i.e. a "chunk") without blocking, for the duration of the load operation, transactions that change data items in the chunk. An IMC is generated based on a consistent read of a chunk as of a particular timestamp. The chunk that is in the process of being pre-loaded into volatile memory is referred to herein as a load-in-progress chunk. At the start of the load operation, in-memory journals are created to track changes made to the load-in-progress chunk. Because transactions that update the data items contained in a load-in-progress chunk are not blocked, and pre-load operations are not instantaneous, it is possible for transactions that update data items that belong to a load-in-progress chunk to start before they are tracked in an in-memory journal, but commit after the IMC has been generated.

According to one embodiment, before an IMC is made available for use, "straddling transactions" affecting data in the IMC are identified. A straddling transaction is a transaction that (a) started before the load start time of the pre-load operation, (b) had not committed before the load start time of the pre-load operation, and (c) modified blocks that were involved in generating the IMC. Transactions that had not committed before the load start time include both transactions that are currently active and transactions that committed after the load start time. The blocks that were involved in the pre-load operation and were updated by straddling transactions are referred to herein as "suspect blocks" because it is possible that the in-memory data structures have no record of these blocks being updated by straddling transactions.

According to one embodiment, suspect blocks are identified by checking if they have been modified by straddling transactions. Once identified, the suspect blocks are invalidated, so that subsequent read operations that make use of the IMC will obtain data items from those blocks elsewhere. Only after the suspect blocks are identified and invalidated within the IMC is the IMC made available to be used to provide data items that are requested by subsequent transactions.

Having been marked as invalid, transactions reading data from the IMC will obtain those data items elsewhere (e.g. from buffer cache or from disk). By only allowing transactions to read data items from the IMC that have not been invalidated, the database server ensures that all transactions making use of the IMC will see (a) all changes committed as of the load start time of the IMC, and (b) no changes committed after the load start time of the IMC.

Techniques are also herein described for repopulating an IMC. An IMC of a chunk is "repopulated" when the IMC is updated (or recreated) to reflect a more recent state of the chunk. For example, an IMC that reflects the state of a chunk X as of time T2 may be repopulated to cause the IMC to reflect the state of the chunk at time T5.

System Overview

Referring to FIG. 1, database cluster 100 has three nodes 102, 122 and 142. Nodes 102, 122 and 142 respectively have one or more processors 108, 128 and 148, and local volatile memory 104, 124 and 144. In addition, nodes 102, 122 and 142 are respectively executing database server instances 106, 126 and 146. While in the illustrated embodiment each node is executing a single database server instance, in alternative embodiments a single node may execute more than one database server instance.

Database server instances 106, 126, 146 execute database commands that are submitted to a database server by one or more database applications (not shown). The data used by those applications is primarily in database 162.

Database 162 contains database objects such as table 164. Table 164 includes three columns c1-c3, and six rows r1-r6 for a total of eighteen data items shown as: R1C1, R1C2, R1C3, R2C1, R2C2, R2C3, R3C1, R3C2, R3C3, R4C1, R4C2, R4C3, R5C1, R5C2, R5C3, R6C1, R6C2, and R6C3. Although the data items are logically arranged in a table when viewed by a user, in the embodiment illustrated in FIG. 1, data items for table 164 are stored as row-major blocks 170, 180, 190 on disk. Each block 170, 180, 190 contains a transaction list 172, 182, 192 for storing the most recent updates to data items in that block.

Block 170 stores data items R1C1, R1C2, R1C3, R2C1, R2C2, R2C3 as well as a transaction list 172 for block 170

Block 180 stores data items R3C1, R3C2, R3C3, R4C1, R4C2, R4C3 as well as a transaction list 182 for block 180

Block 190 stores data items R5C1, R5C2, R5C3, R6C1, R6C2, R6C3 as well as a transaction list 192 for block 190

Each of nodes 102, 122 and 142 is able to independently access any block 170, 180, 190 of table 164. After accessing a particular block, the block may be cached in a local buffer cache 118, 138, 158. It is much faster for any given database server instance to access data items of table 164 from blocks that are stored in its local volatile memory. If a node updates a block and the modifications to that block are not reflected on disk 160, that particular buffer cache is referred to as "dirty." If the node has a copy of a block in a local buffer cache and the copy of the bock is the same as the on-disk copy, then the buffer cache is said to be "clean."

For the purpose of illustration, database 162 is shown as stored on a single shared disk 160, but in alternative embodiments, database 162 may be spread across multiple disks to which each of nodes 102, 122 and 142 have access.

Requesting Access to Data Blocks

According to one embodiment, permission to access data blocks in database 162 is managed through a lock system. When a node requires access to a block, the node requests read access to the block from a node that has been designated to be the "lock manager" for that block. The lock manager responds by sending a read lock to the requesting node. The read lock grants the requesting node permission to read data items from the block, while not excluding other nodes from requesting other read locks for that block.

The node that manages the locks for a particular set of blocks is the lock manager for that set of blocks. According to one embodiment, a set-of-blocks-to-lock-manager mapping is maintained so that, given a specific block identifier, any node in the cluster 100 is able to determine the lock manager for any set of blocks.

For example, in database cluster 100, assume node 102 is the lock manager for a range of blocks that includes all of the blocks in table 164. Under these circumstances, the set-of-blocks-to-lock manager mapping would map the identifier for blocks 170, 180, and 190 to node 102.

Requesting Access to Data Blocks in a Distributed Load

In some embodiments, loading IMCs may be a distributed process. For example, one node 102 in the cluster 100 may receive a command to distribute table 164 across the volatile memories of the nodes in the cluster 100. The node 102, referred to as a "load operation master", may initially request from the appropriate lock manager an exclusive lock for blocks 170, 180, 190. The load operation master (i.e. node 102) divides the table 164 into distinct portions and then sends a message of consistency information to the nodes 102, 122, 142 in the cluster 100. Using the consistency information, each node determines which distinct portions of table 164 to pre-load into its volatile memory. The node that is assigned to pre-load a chunk is referred to herein as the host of the chunk. The chunks of table 164 may be assigned in a manner that distribute the chunks across the volatile memories 104, 124, 144 of nodes 102, 122, 142. For the purpose of explanation, it shall be assumed that each chunk contains values from a single column of table 164, though chunks may contain values from many columns. Specifically, it shall be assumed that:

Node 102 is assigned to host a chunk that contains all values from column C1, which includes data items R1C1, R2C1, R3C1, R4C1, R5C1, R6C1

Node 122 is assigned to host a chunk that contains all values from column C2, which includes data items R1C2, R2C2, R3C2, R4C2, R5C2, R6C2

Node 142 is assigned to host a chunk that contains all values from column C3, which includes data items R1C3, R2C3, R3C3, R4C3, R5C3, R6C3

After the load operation master has sent the consistency information to the nodes, the load operation master downgrades the exclusive lock to a shared lock. Each node assigned to host a chunk then obtains from the appropriate lock manager a shared lock for any blocks that belong to the chunk that they have been assigned to host. The nodes may then independently read their assigned chunks autonomously and in parallel.

In the example embodiment illustrated in FIG. 1, the blocks 170, 180, 190 store data items from table 164 in row-major format. However, the data items from table 164 have been divided into chunks based on the columns. Because each block contains at least one data item from each column, the chunk assigned to each node 102, 122, 142 has some data items in each block 170, 180, 190. Assuming node 102 is the lock manager for a range of blocks that include all of the blocks in table 164, each node 102, 122, 142 obtains a shared read lock from node 102 for each of the blocks 170, 180, 190. Because these locks are shared read-only locks, all of the nodes 102, 122, 142 have access to all of the blocks 170, 180, 190 for pre-loading.

Additional details about parallel loading operations are provided in U.S. patent application Ser. No. 14/565,906, entitled "DISTRIBUTION OF AN OBJECT IN VOLATILE MEMORY ACROSS A MULTI-NODE CLUSTER", filed Dec. 10, 2014 which is incorporated herein by this reference.

Pre-Loading Chunks without Blocking Updates to the Chunks

As shall be described in greater detail hereafter, techniques are provided for pre-loading chunks in a manner that does not block updates to the chunks during the chunk-pre-loading operation. In general, the process involves flushing dirty blocks of the chunk to disk, reading each block from the disk, determining whether the block was touched by a straddling transaction and, if so, marking the data items from that block that are loaded into the IMC as invalid. Each phase of the techniques is described in greater detail hereafter.

IMCs are typically compressed data, so keeping the data items in an IMC up-to-date on a transaction-by-transaction basis is inefficient. Instead, changes made to blocks that belong to an IMC are recorded in a journal, separate from the IMC itself, which is maintained in volatile memory. When transactions read data from the IMC, the transactions determine whether the IMC's copy of the data they need is invalid/stale. For any data that is invalid/stale, the transactions attempt to obtain the required version of the data from the journals. If the journals do not have the needed version of the data, the transactions may search in a buffer cache and ultimately on disk. When performance begins to degrade because a significant percentage of an IMC has gone stale/invalid, the IMC may be repopulated with up-to-date data items in a single repopulate operation. In some embodiments, the old IMC is invalidated and a new IMC is created in a sequential process. These embodiments conserve volatile memory at the expense of temporarily losing the benefit of an IMC. In other embodiments, the old IMC continues to be maintained in memory, and made available to transactions, while the repopulated IMC is being created. These embodiments provide use of the old IMC while the new IMC is loading at the expense of using more volatile memory.

Flushing Dirty Blocks Before Pre-Loading a Chunk

At the time a pre-load operation for a chunk is to begin, the on-disk version of the chunk may not reflect all changes made to the chunk as of the load start time. For example, assume that, before node 102 loads the chunk that contains R1C1, R2C1, R3C1, R4C1, R5C1, R6C1 (hereafter "chunk X"), node 122 makes a change to a cached copy of block 170. This scenario is illustrated in FIG. 2A.

Figure 2A:
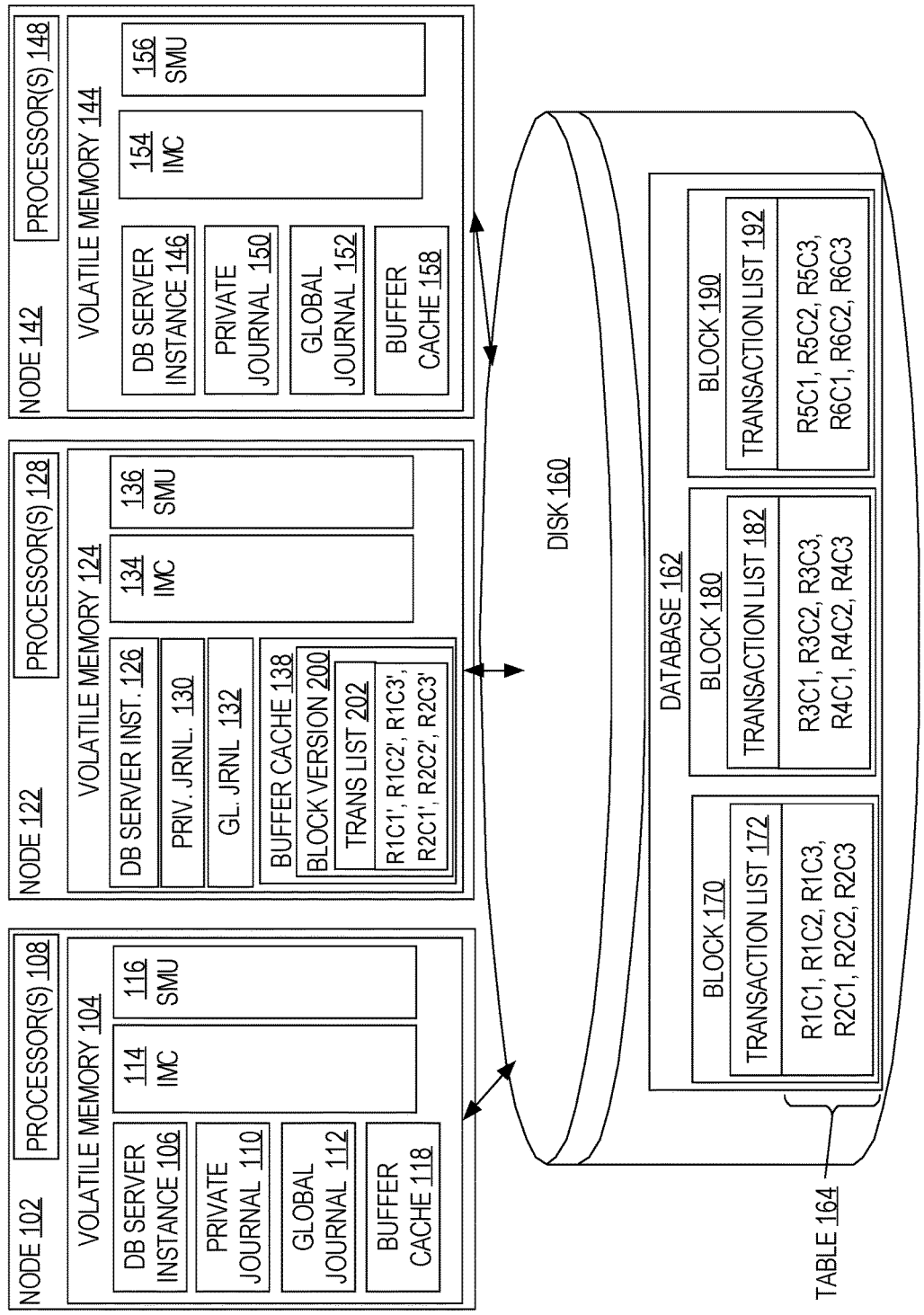
FIG. 2A is a block diagram illustrating a database system architecture with a version of a block in a buffer cache.

Specifically, referring to FIG. 2A, database server instance 126 performs a DML operation against a block version 200 that is a version of block 170. Buffer 138 thereby becomes a "dirty buffer" because the changes made to the data items in buffer 138 are not yet written to disk. Assume that the update changes data items R1C1, R1C2, R1C3, R2C1, R2C2, R2C3 in the buffer 138 to R1C1', R1C2', R1C3', R2C1', R2C2', R2C3'. The changes are tracked in the transaction list 202 of block version 200, but are not yet stored in the on-disk transaction list 172 because block version 200 has not yet been written to disk.

Figure 2B:
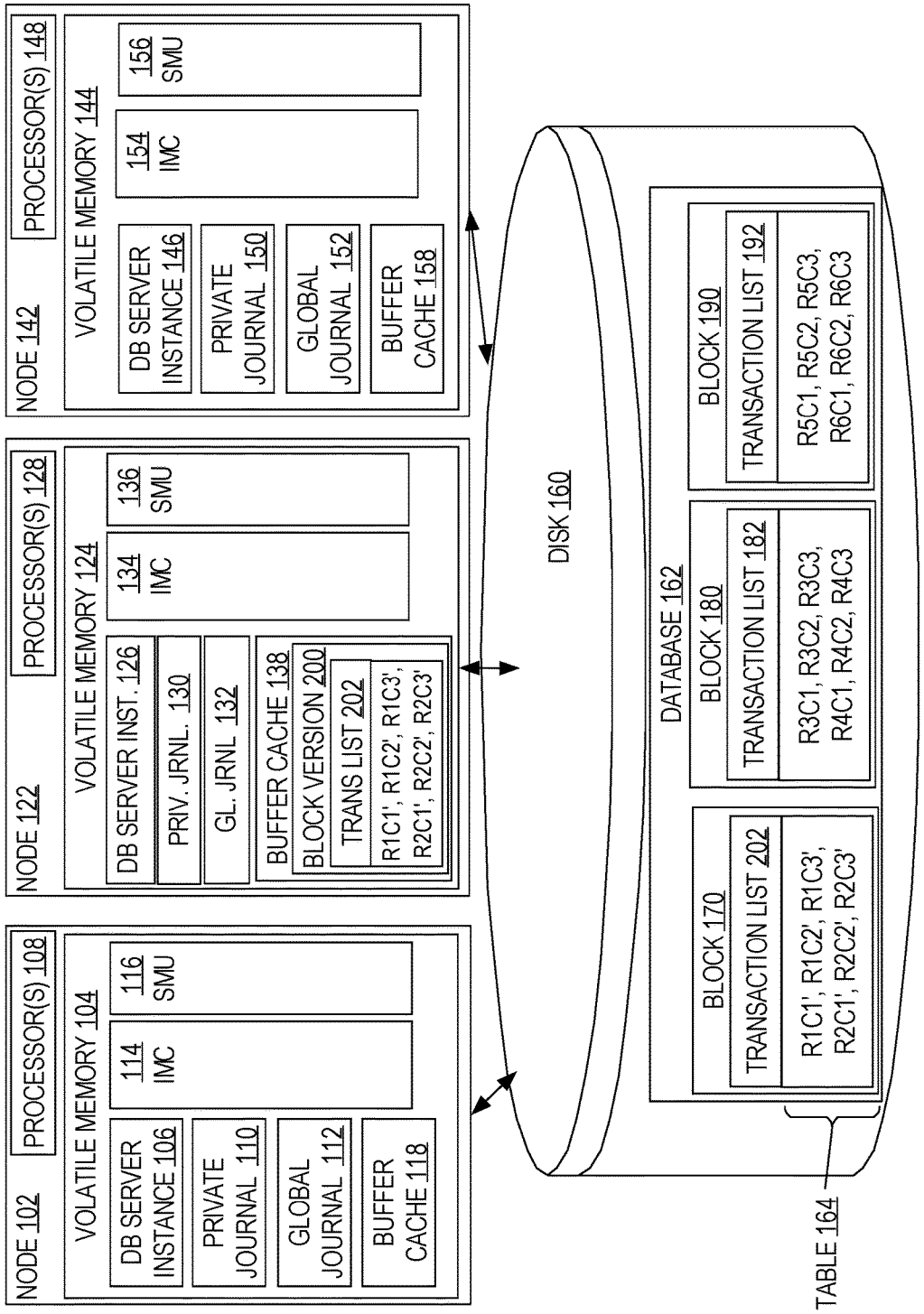
FIG. 2B is a block diagram illustrating a database system architecture with a version of a block written to disk.

According to one embodiment, to ensure that the on-disk version of a chunk is at least as current as the load start time, all nodes are instructed to flush to disk all dirty buffers with blocks that belong to the chunk involved in the pre-load operation before the chunk load operation begins. Once all nodes have confirmed that those dirty buffers have been flushed to disk, the chunk load operation may begin. FIG. 2B is a block diagram illustrating a database system architecture with a version of a block written to disk. Block 170 mirrors the data items R1C1'-R2C3' and transaction list 202 of block version 200.

In one embodiment, rather than issuing a flush command for the range of blocks that contain the to-be-loaded chunk, the flush command is issued for the entire database object to which the chunk belongs. In practice, multiple pre-load operations involving the same database object may be performed in parallel to distribute the various chunks of entire database objects (tables, partitions, etc.) across multiple nodes. Issuing a single flush command for an entire database object eliminates a large amount of cross-communication among nodes that would result from issuing a separate flush command for every to-be-loaded chunk in the table.

Cache Fusion

In some embodiments, a database server instance may transfer a dirty block between nodes even though the block has not yet been written to persistent storage. As a result, the cluster may have multiple dirty copies of the same block located in one or more buffer caches. Each copy represents a different version of the block, none of which has been written to disk. To prevent multiple nodes from writing the same block to disk at the same time and to prevent a node with an earlier version of a block from overwriting a more recent version of the block, the lock manager may contain a write-to-disk request queue for each block.

When a database server instance needs to write a dirty block to persistent storage, the database server instance sends a write request to the lock manager assigned to the block. The lock manager will eventually respond by (1) granting the database server instance permission to perform the write, or (2) informing the database server instance that another database server instance has already written to persistent storage a version that is at least as recent as the dirty version stored local to the database server instance. This second option is referred to herein as a "write-notification" message.

Local Vs Global Locks

According to one embodiment, locks may be in a "local" mode or a "global" mode. Initially, when a lock manager grants a node permission to update a clean block, the lock manager grants a local lock. A node with a local lock on a dirty block can write the dirty block to persistent storage without requesting permission from the lock manager. However, if that dirty block is transferred or copied to another node's cache before being written to persistent storage (e.g. because of a lock request from the other node), then the mode for the lock is converted from local to global. In addition, the lock given to the node to which the dirty block is transferred is also global. A node with a global lock on a data item may only write the data item to persistent storage after receiving permission to do so from the lock manager.

When a current version of a data item is written to persistent storage, then the node that writes the data item to persistent storage may send a confirmation message to the lock manager. In addition, the node may also convert its lock for that block from global to local. Upon receiving the confirmation message, the lock manager sends write-notification messages to nodes that have a "covered" version of the block. A "covered" version of the block is a version that is at least as old as the version that was written to persistent storage. The write-notification messages indicate to those other nodes that they need not retain copies of the block in their volatile memories. These nodes have effectively been freed from their obligation to write the block to disk because an at-least-as-current version of the block has been written to disk.

In a system where each node acquires all locks on all blocks necessary to load a chunk before actually loading any data, the pre-loading operation may gain an additional benefit from the awareness provided by the local and global modes of the locks. The host node may check that none of the locks obtained for the pre-loading operation are global or the inverse that all of the locks obtained for the pre-loading operation are local. If either of these conditions is true, then there is no need to flush.

For example, as presented in FIG. 1, assume node 122 requests locks for pre-loading data items from blocks 170, 180, 190 before any other node in the cluster requests an exclusive lock to change data items in one of those blocks. Node 102 as the lock manager would grant node 122 three local shared locks over blocks 170, 180, and 190, respectively. With each local lock, node 122 may pre-load data items from blocks 170, 180, 190 and generate a local IMC 134 without sending a flush message to the other nodes 102, 142. No flush is needed when all the buffers are "clean." Specifically, buffers 118 and 158 do not contain data items from blocks 170, 180, 190 yet, so a flush operation is unnecessary.

The node assigned to host a chunk need not send out a flush command when all of that node's locks are local, but that node may still need to flush itself. For example, in FIG. 2A if each node is configured to read directly from disk for the pre-loading operation, then node 122 would have to flush its own dirty buffer 138 before loading from disk 160. In an alternative embodiment, node 122 may not even need to flush block version 200 as long as the data assigned to node 122 is read from the local buffer cache 138. In this example, node 122 could still receive a flush message from another node (102 or 142) if the two nodes (e.g. 102 and 122) are assigned to host data from the same block (i.e. block 170). However, where nodes are assigned to load completely different blocks (such as when each node is assigned to load a separate partition), the node assigned to host data already located in its own dirty buffer may not be required to flush.

Avoiding a flush most often occurs during cluster startup, but may occur in a variety of other situations. For example, if there is only one node in a cluster, then each lock's mode would be local by default. Additionally, all of the locks for a particular resource may be periodically changed to local after all dirty buffers for the particular resource have been written to disk in a periodic "checkpoint" operation.

For more information on local versus global locks see U.S. patent application Ser. No. 13/205,443 filed Aug. 8, 2011, "METHODS TO PERFORM DISK WRITES IN A DISTRIBUTED SHARED DISK SYSTEM NEEDING CONSISTENCY ACROSS FAILURES," inventors Shashikanth Chandrasekaran et al., the entire contents of which is hereby incorporated by reference as if fully set forth herein.

Permitting DML Operations During Pre-Load

Significantly, using the techniques described herein, it is not necessary for the host nodes to obtain all of the read locks necessary to pre-load a chunk before starting the pre-load operation. Because host nodes do not block access to blocks that belong to load-in-progress chunks for the entire duration of the pre-loading operation, it is possible for blocks that belong to a load-in-progress chunk to be changed by straddling transactions, as defined above. Since it is possible for DML statements to be executed against blocks that belong to a load-in-progress chunk, other measures must be taken to ensure that blocks affected by any such DML statements are not seen by transactions that access the newly-created IMC.

For example, assume that at time T1 database server instance 106 creates private journal 110 and starts to load the chunk containing data items R1C1, R2C1, R3C1, R4C1, R5C1, R6C1. Assume further that, before node 102 obtains a read lock on block 180, a DML statement of a straddling transaction updates data item R3C1 to R3C1'. When block 180 is read as part of the pre-loading operation, block 180 will reflect the committed state of table 164 at time T1. Specifically, in the pre-loading operation, node 102 will see the value R3C1, so IMC 114 will contain the value R3C1. If the straddling transaction is committed, then the private journal 110 will not be able to push the aggregate transaction data to a global journal because the straddling transaction started before the private journal 110 existed. Thus, the portion of the IMC 114 containing data affected by the straddling transaction is marked as invalid.

Blocking DDL Operations During Pre-Load

As mentioned above, DML operations on blocks within a load-in-progress chunk are not blocked. On the other hand, in some embodiments, database definition language (DDL) statements that alter the "shape" of a load-in-progress chunk are blocked until the pre-loading of the chunk has completed. For example, specific statements such as "DROP COLUMN" or "DROP TABLE" may be put on hold until the end of a load operation. However, even for these operations, the pre-loading of a partitioned table need not be complete before the shape changing operation is executed. Specifically, once all data items from a partition have been pre-loaded, the DDL operation may be executed against the partition even though the pre-loading of data items from the other partitions of the table has not completed. For example, if table 164 is split into three partitions A, B and C, then a DDL operation may be executed against partition A as soon as partition A has been pre-loaded, even if the pre-loading of partitions B and C has not yet finished.

Creating in-Memory Data Structures

According to one embodiment, before a chunk is pre-loaded, in-memory data structures are created for the not-yet-loaded IMC. According to one embodiment, a load start time for the load operation is assigned to the newly created data structures at this time. The load start time is a timestamp that indicates when a chunk load operation begins. As shall be explained hereafter, the load start time may be used for rolling back the database 162.

IMCs 114, 134, 154 are the containers for the copies of chunks from table 164. The IMCs 114, 134, 154 may be configured to store data in a compressed format or in a format different from the on-disk blocks. For example, IMCs 114, 134, 154 may be configured to store compressed column-major format data rather than the row-format data as stored in disk blocks 170, 180, 190. For more information, see the Mirroring application described in the background.

Each not-yet-loaded IMC has a corresponding snapshot metadata unit (SMU) 116, 136, 156. Each SMU contains one or more bitmaps (sometimes referred to as bit vectors) indicating the validity of data items or blocks of data items in the corresponding IMC. Each SMU includes one or more bitmaps indicating whether updates to in-memory data items or blocks are recorded in global journals 112, 132, 152.

Global journals 112, 132, 152 store the most recent committed updates to data items in the corresponding IMC 114, 134, 154. Private journals 110, 130, 150 store uncommitted local transaction information.

The IMCs 114, 134, 154, in conjunction with global journals 112, 132, 152, provide data items to transactions faster than it takes to read the data items from on-disk blocks 170, 180, 190. However, the copy of a data item that resides in an IMC is typically compressed and difficult to update, so that copy is allowed to become stale when the data item is updated. Consequently, a read transaction that needs the current version of the data item uses a "roll forward" approach, where stale data items from the IMC are rolled forward based upon information in the corresponding global journal. In contrast, the data items in a disk block are kept up-to-date, and the transaction list for a particular disk block may be used to "roll back" the data items when an earlier version of the data item is needed.

Obtaining Data to Populate the IMC

When an IMC is initially populated with the data items that belong to a chunk, it is possible to retrieve all of the data items from disk. However, it may be possible to obtain some of the data items from volatile memory, thereby avoiding the overhead of going to disk for those items. Loading data items from a locally-cached block into an IMC, when possible, is far more efficient than obtaining the data items by accessing the on-disk copy of the block.

In order for the data for a pre-loaded IMC to be obtained from a cached block, the node with the cached block should include transaction information that is at least as current as the load start time. Consequently, in systems that allow the reconstruction of past versions of blocks, the database server keeps track of which cached blocks are past versions (i.e.

have had changes rolled back). Those past versions that have had changes rolled back are disqualified for use in populating the IMC, because some of the removed changes may be changes that existed as of the load start time.

According to one embodiment, the permissions granted to read the block are different than the traditional read permissions because a typical read only involves accessing data items and transaction information as of the last commit. The lock granted to pre-load data items from a buffer cache should include permissions for reading any "dirty" block information in addition to the last committed data. Various ways for determining whether the data from a cached block may be used when pre-loading a chunk shall be described in detail hereafter.

Determining Whether a Cached Version of a Block Reflects a State that is at Least as Recent as the Load Start Time According to one embodiment, locks are used to determine whether a cached block reflects a state that is at least as recent as the load start time. For example, if a node has an exclusive lock for a block contained in a buffer cache, then it is guaranteed that no other nodes in the cluster can update the block. Consequently, the node has the most current version of the block.

Even when a node does not hold an exclusive lock on a cached block, it may be possible to populate an IMC with data items from the cached block. For example, a node can have a "hold" lock on a block contained in the buffer cache indicating that the copy of the block is a past image of the block. Because the copy of a block in the buffer cache does not contain the most up-to-date transaction information, the copy's state must be compared to the load start time to determine if the version of block reflects a state that is at least as recent as the load start time. If the copy's state is later than the load start time, then data items from the cached block may be used to populate an IMC.

For more information on hold locks see U.S. Pat. No. 6,353,836 filed Nov. 24, 1998, "METHOD AND APPARATUS FOR TRANSFERRING DATA FROM THE CACHE OF ONE NODE TO THE CACHE OF ANOTHER NODE," inventors Roger J. Bamford et al., the entire contents of which is hereby incorporated by reference as if fully set forth herein.

Figure 2C:
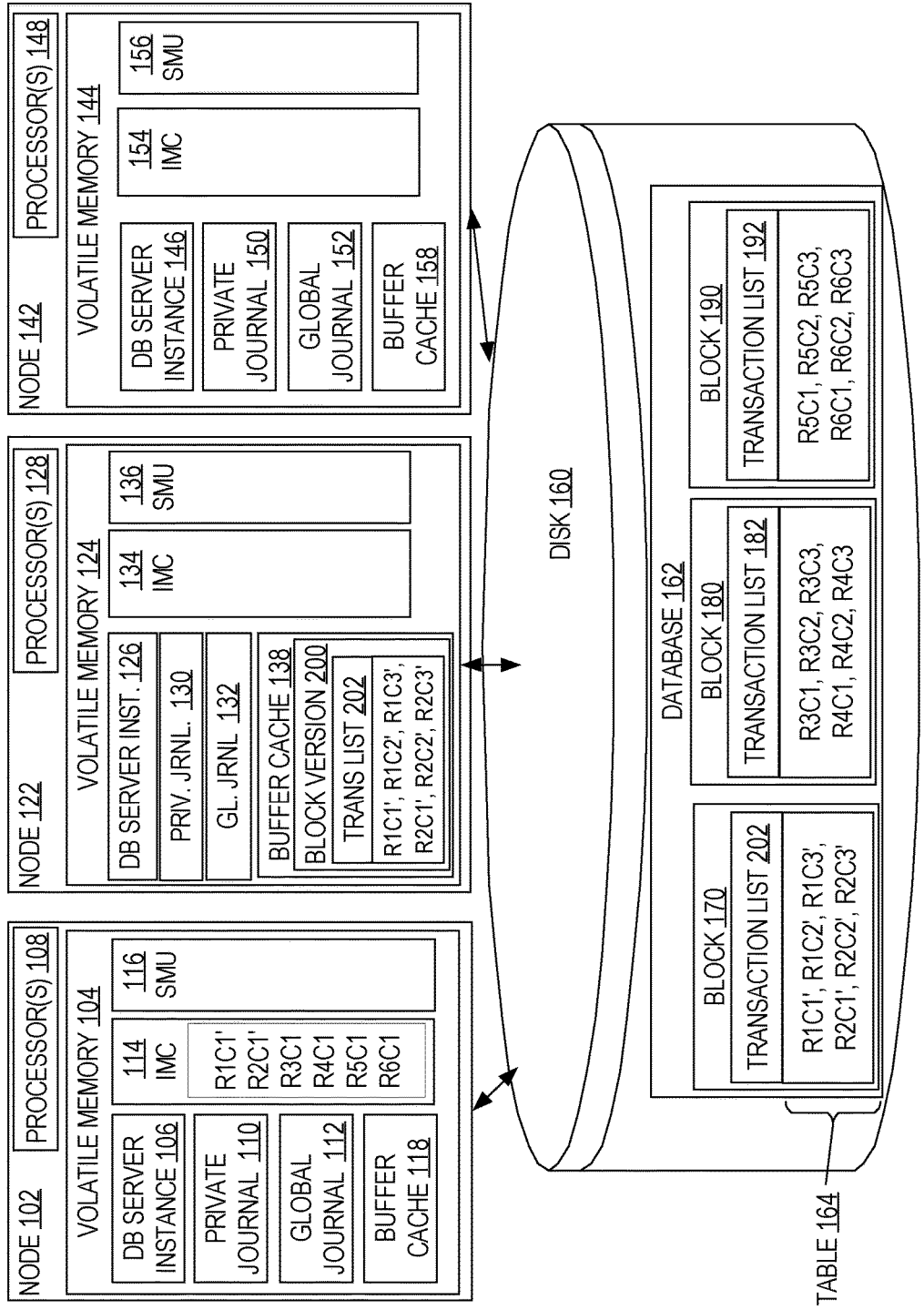
FIG. 2C is a block diagram illustrating a database system architecture with a copy of a chunk in an IMC.

Assume node 122 in FIG. 2C has an on-going transaction while performing a pre-load operation. The pre-load operation is a distinct transaction from the on-going transaction. Because the on-going transaction is the only transaction that can see uncommitted changes, the pre-load transaction will only see the version of block 200 that has the last committed changes.

The data items would be read as of the last commit: R1C1, R1C2, R1C3, R2C1, R2C2, R2C3

The transaction list would be read as of the last commit: transaction list 172.

The read protocol for loading an IMC is adjusted from the typical read operation to not read out the current transaction list.

The data items are read as of the last commit: R1C1, R1C2, R1C3, R2C1, R2C2, R2C3

The transaction list is read as a current transaction list 202.

Figure 2D:
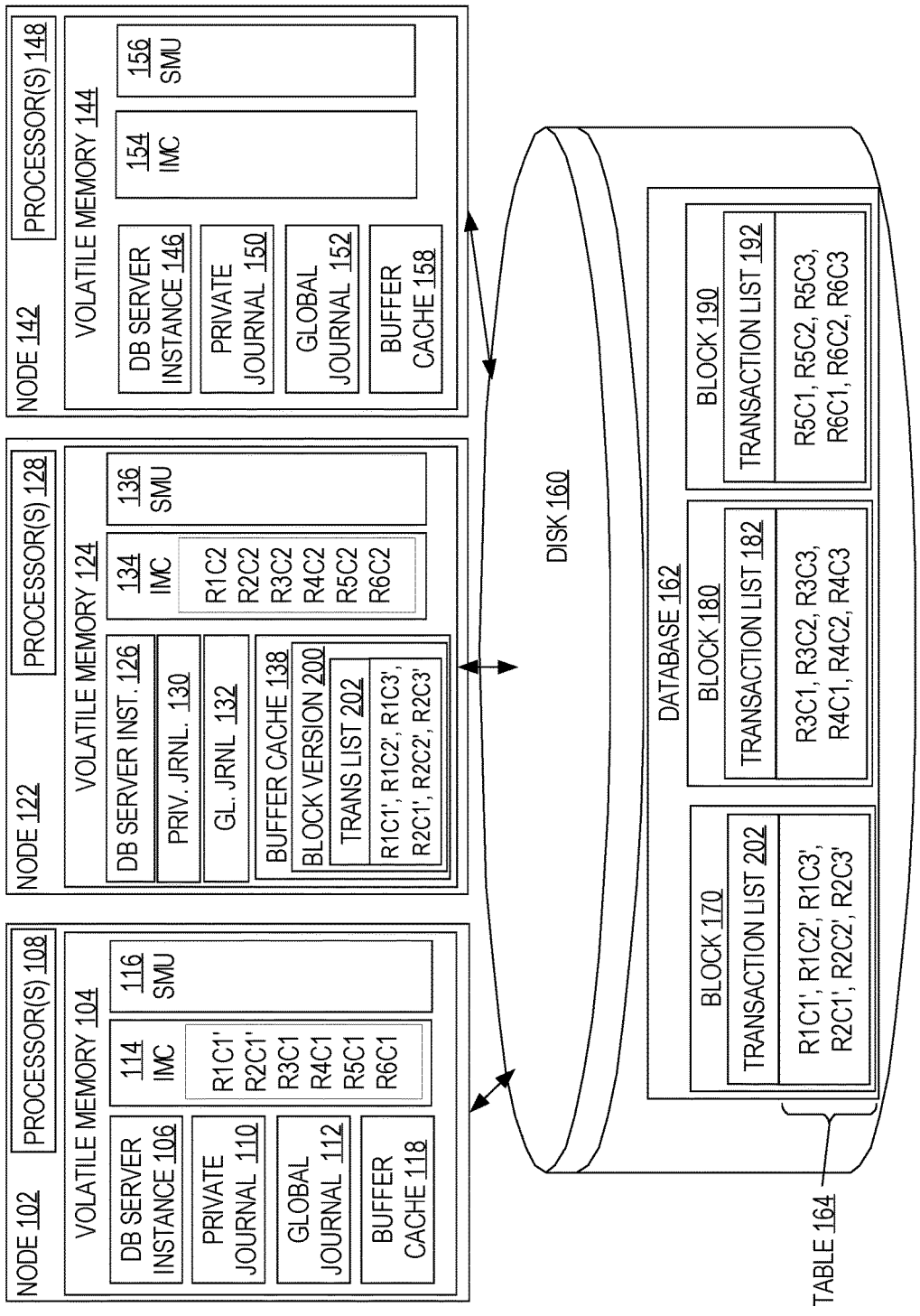
FIG. 2D is a block diagram illustrating a database system architecture with a copy of a different chunk in a different IMC.

Any blocks not located in the local buffer cache may be read from disk as previously described. FIG. 2D is a block diagram illustrating the data items loaded into IMC 134 partially from cached block version 200. The other data items are read from blocks 180 and 190 residing on disk 160. A copy of data items R1C2, R2C2, R3C2, R4C2, R5C2, R6C2 are located in IMC 134.

Identifying Straddling Transactions

Each given block contains a transaction list that stores transaction data regarding the transactions that affect that given block. Straddling transactions are identified by scrutinizing the transaction list of each given block used to generate an IMC. After or while a host node pre-loads data items from the given block, the database server instance compares the commit times of transactions to the load start time of the pre-load operation. The transactions within those transaction lists typically include active transactions and committed transactions Active transactions are straddling transactions if they started before the load start time of the pre-load operation. Active transactions that are straddling transactions are referred to herein as "active straddling transactions."

Committed transactions are straddling transactions if they started before, but committed after the load start time of the pre-load operation. Committed transactions that are straddling transactions are referred to herein as "committed straddling transactions."

According to one embodiment, the database server instance that loads a particular block checks the transaction list of that block in reverse chronological order. The first transaction scrutinized is either active or the most recently committed transaction that modified the block. Each transaction is inspected until either (a) a straddling transaction is identified, or (b) a transaction that committed before the load start time is identified. If a straddling transaction is identified, the block is a suspect block and is marked invalid for the IMC. If a transaction that committed before the load start time is identified, then the block is not invalidated for the IMC.

If the transaction list of a block does not include any transaction that started before the load start time, then the block can be rolled back to get an older version of the transaction list. The process of inspecting the transaction list and rolling back the block to get an older version of the transaction list may be repeated until either (a) a straddling transaction is identified, or (b) a transaction that committed before the load start time is identified. In the case where all transactions in the transaction list started after the load start time and no further rollback can be performed because the database server instance does not have transaction data for the next transaction that needs to be rolled back, it is not possible to know whether the block was updated by a straddling transaction. Under these circumstances, the block is treated as an "indeterminate" block. Indeterminate blocks are assumed to have been updated by a straddling transaction and are invalidated.

FIG. 7 is a flowchart illustrating how a database server scrutinizes the transaction list of each block that has data items used to generate and IMC. At step 702, a database server instance reads the most recent transaction for the block. At step 704, the database server instance determines whether the transaction is active, and at step 706, the database server instance determines whether the transaction committed after the start of the pre-load operation. If both step 704 and step 706 are determined to be false, then the block is determined to be valid at step 710. Otherwise, if either of the decisions at steps 704 or step 706 is determined to be true, then the database server instance determines, at step 708, whether the transaction started before the pre-load operation. If the transaction started before the pre-load operation, then data items generated from the block are determined to be invalid at step 714 because the block contains a straddling transaction. Otherwise, at step 712, the database server instance determines whether there are any-more transactions in the suspect block. If the block contains more transactions, the database server instance repeats the process with the next most recent transaction. If the block has no more transactions, then the block is determined, at step 714, to be invalid because the block is an indeterminate block.

The process described in FIG. 7 is performed on each block for a load-in-progress chunk. For example, FIGS. 3B-3D are block diagrams illustrating a database server instance 146 scanning the transaction lists 320, 340, 192 for three blocks 170, 180, 190 of the load-in-progress chunk comprising column C3 for six contiguous rows. The transaction lists have fields containing transaction information such as an index for identifying the transaction and a status flag for indicating whether the transaction is active or committed.

In some embodiments, a transaction list may not contain all necessary information. Instead, the transaction list contains a reference to the necessary information. For example, the transaction list may only contain commit times for a particular transaction, in which case, the server performing the scan of the transaction list would determine the start time of a committed transaction by referring to a different table or by determining the start time of the transaction by rolling back the database.

Valid Block Example

In a preferred embodiment, the transaction list of a block is organized in chronological order of commit time, so the transaction list can be scanned from any currently active transaction (or the transaction with the most recent commit time) to the transaction with the oldest commit time. By scanning a transaction list in reverse chronological order, a transaction that committed before the load start time (a "pre-load-start transaction") may be identified without scanning the entire transaction list.

FIG. 3D is a block diagram illustrating a pre-load-start transaction. The transaction list 192 for data from block 190 is organized in chronological order of commit time. By comparing the timestamp 300 with the commit time of the transaction having an index of 2, database server instance 146 determines that the transaction with an index of 2 started (t25) and committed (t30) after the load start time (t15). Moving on to the next transaction in reverse chronological order, database server instance 146 compares the commit time (t12) of the transaction with an index of 1 to the load start time (t15). This transaction with an index of 1 is a pre-load-start transaction, so the transaction cannot be a straddling transaction.

Because the transactions are scanned in reverse chronological order, there cannot be a straddling transaction once a pre-load-start transaction has been encountered in the scan. Thus, the comparison of the load start time with the transaction times ends after scrutinizing transaction 362. The bit 364 for block 190 is left marked as valid in the corresponding SMU 156. Because the block is left unmarked as valid, the corresponding rows are also effectively unmarked as valid in the row-level invalidity bitmap 328.

When the IMC 154 is read, node 142 will read from the block level bitmap 326 and row level bitmap 328 that the data items R5C3, R6C3 are valid and that there is no updating information in the corresponding global journal 152 from the in-journal bit map 330. For node 142, rows for block 190 will be read from IMC 154.

Indeterminate Block Example

In some embodiments, transaction lists are allocated a threshold amount of space in a block. After that amount of space is exhausted, a node committing a new transaction to the block overwrites the transaction with the oldest commit time. The process repeats in a circular fashion, so the next node to commit a new transaction overwrites another transaction with the next oldest commit time.

When reviewing the transaction list for the pre-load operation, there may not be enough information to identify a straddling transaction because the information was overwritten. If the oldest start time for a transaction in a particular block is after the load start time for the pre-load operation, not enough information exists to identify the block as valid. The block is marked invalid based on the conservative assumption that a straddling transaction could have occurred.

For example, in FIG. 3C assume transaction list 340 is only allocated space for three transactions. After six transactions, the transaction list contains no transactions with commit times before the load start time. The oldest transaction 342 is valid, but the transaction before the oldest transaction 342 may have been a straddling transaction. By comparing the timestamp 300 with the start and commit times of transaction 342, database server instance 146 determines that the load start time of t15 is before the earliest recorded transaction start time t20 and transaction commit time t30, so the transaction list 340 does not provide enough information about the block 180.

Because there is no way to determine whether the previous transaction was valid, the bit 344 for block 180 is marked as invalid in the corresponding SMU 156. Because the block is marked as invalid, the corresponding rows are also effectively marked invalid in the row-level invalidity bitmap 328.

When the IMC 154 is read for a DML statement, the node will read from the block level bitmap 326 that the data items R3C3, R4C3 are invalid and that there is no updating information in the corresponding private journal 150 or global journal 152 from the in-journal bit map 330. For node 142, rows for block 180 will be read from disk 160. If block 180 was cached in a buffer cache 158, the rows could be read from the buffer cache 158 instead.

Active Straddling Transaction Example

Figure 3A:
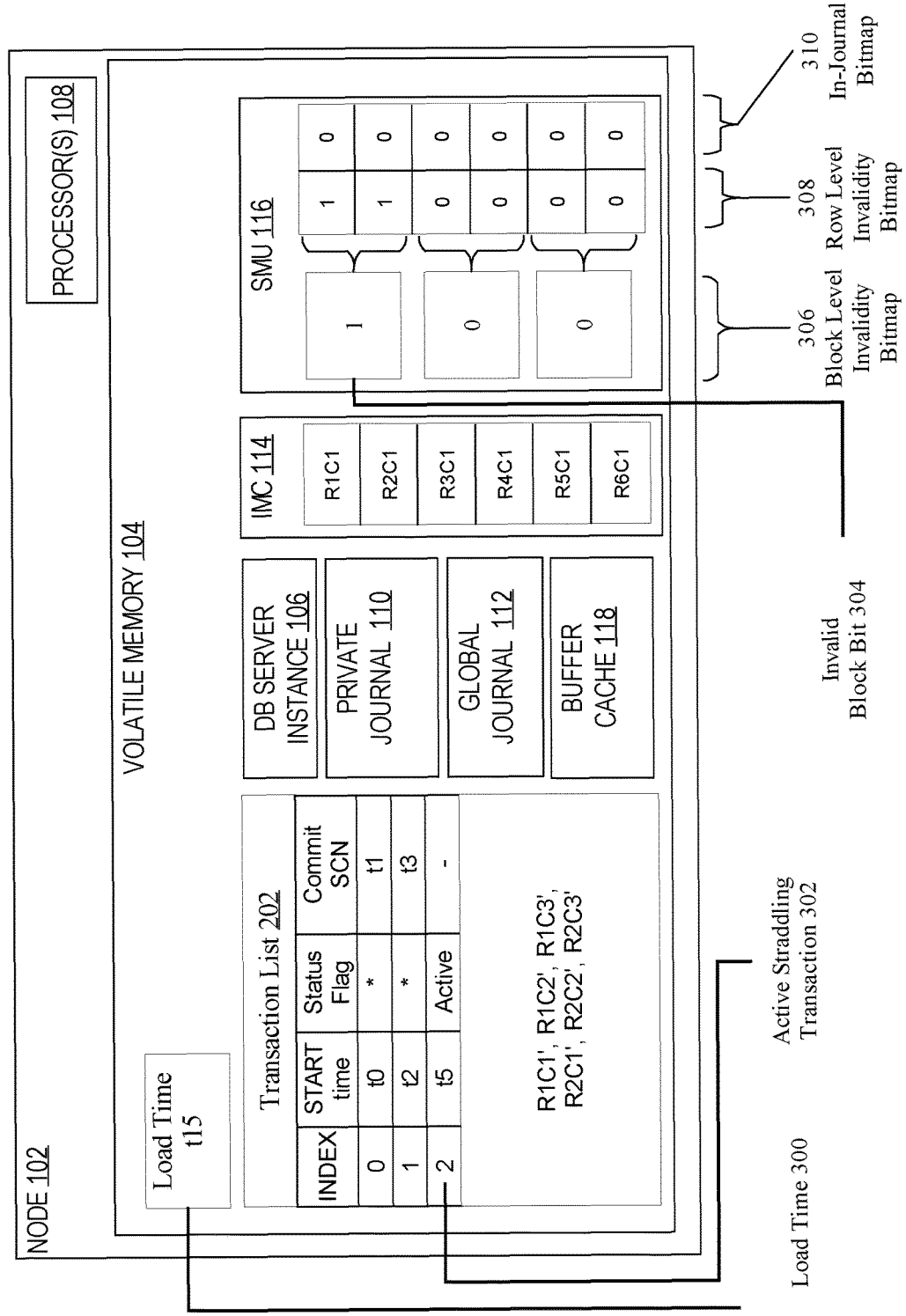
FIG. 3A is a block diagram illustrating a database server instance comparing a block's transaction list with a loading timestamp to identify an active straddling transaction.
Figure 3B:
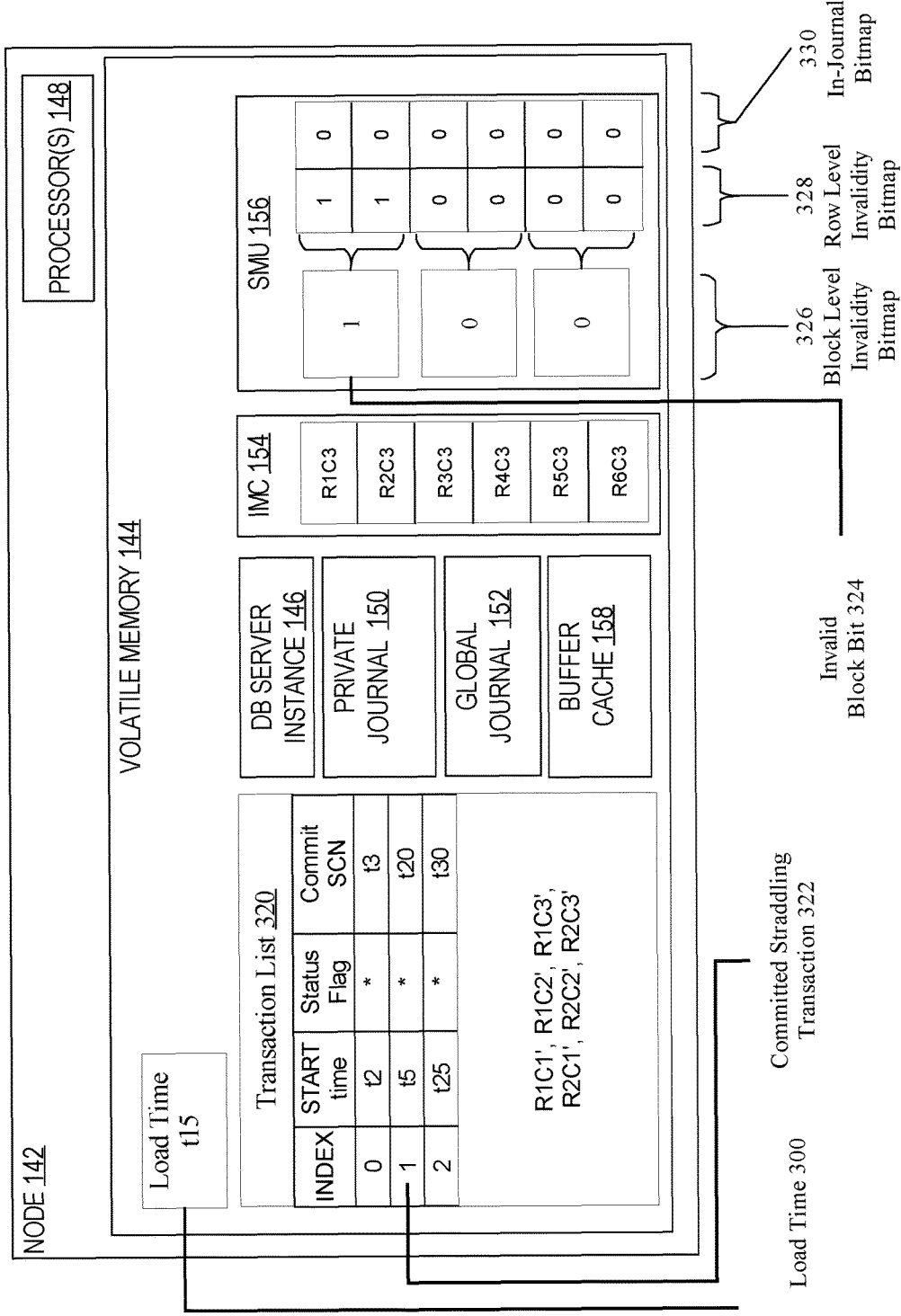
FIG. 3B is a block diagram illustrating a database server instance comparing a block's transaction list with a loading timestamp to identify a committed straddling transaction.
Figure 3C:
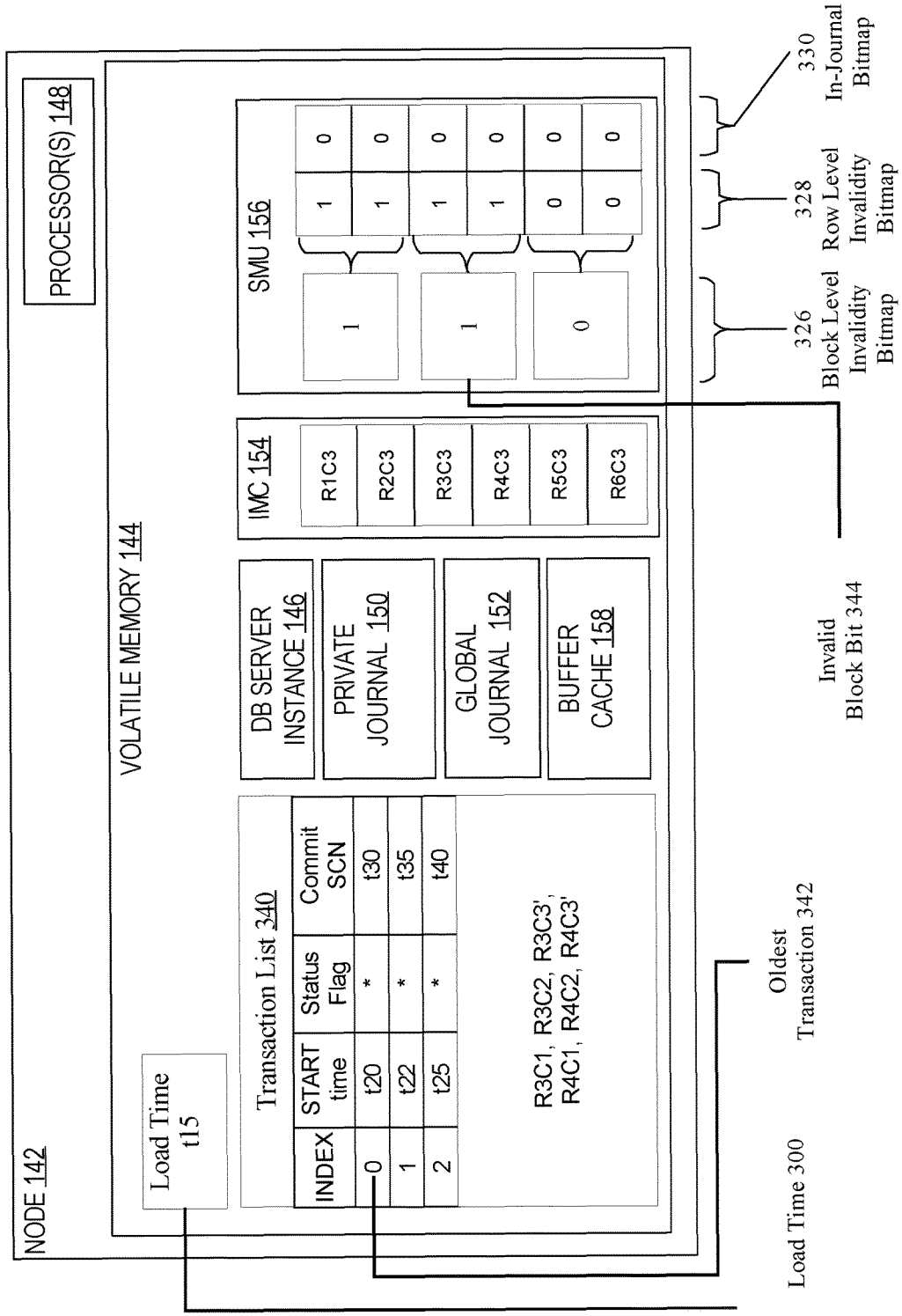
FIG. 3C is a block diagram illustrating a database server instance comparing a block's transaction list with a loading timestamp to identify an indeterminate block.
Figure 3D:
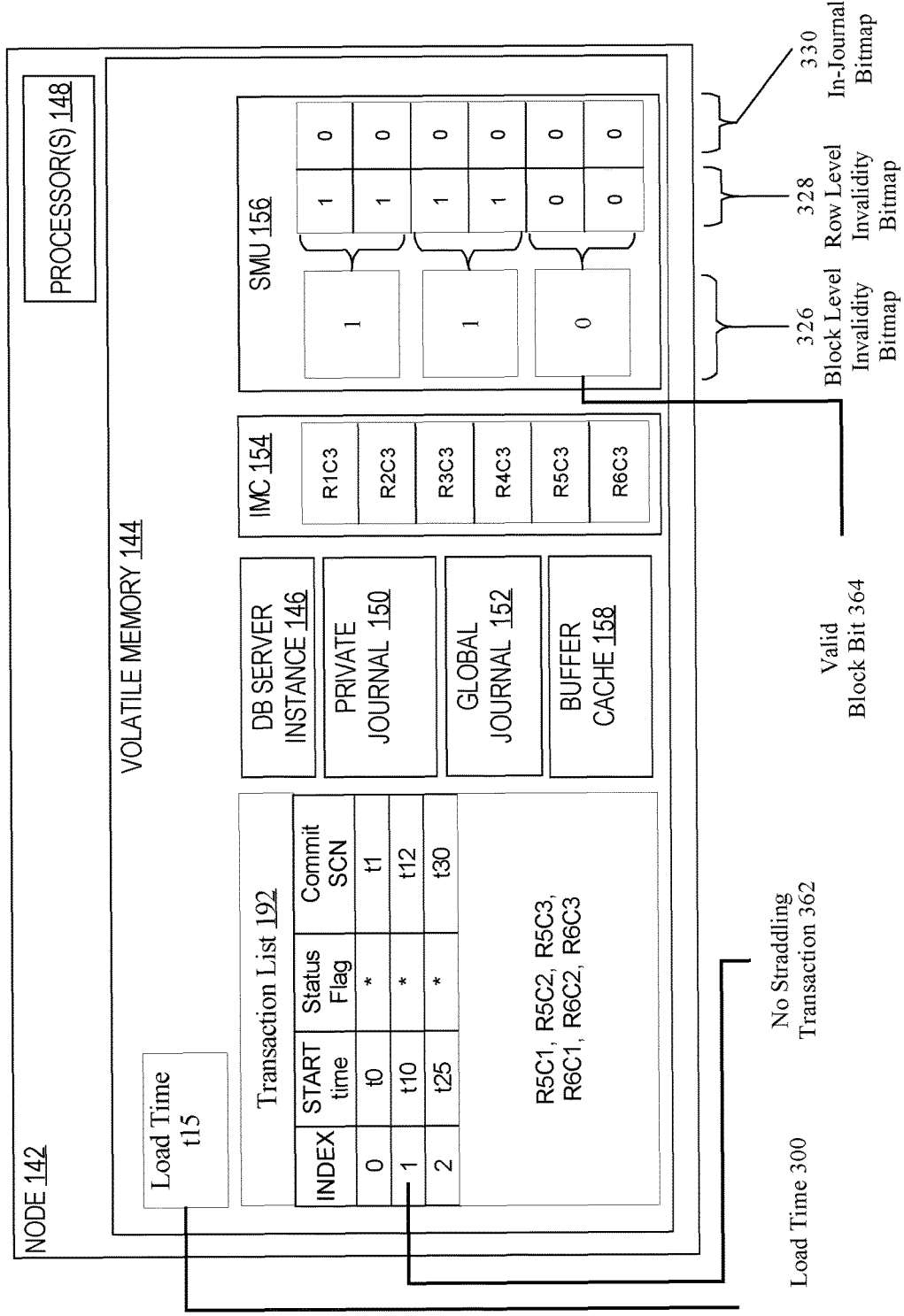
FIG. 3D is a block diagram illustrating a database server instance comparing a block's transaction list with a loading timestamp to identify a valid block.

FIG. 3A is a block diagram illustrating an active transaction with a start time before the load start time. Assume this transaction list is scanned by node 102 after loading R1C1 and R2C1 and generating IMC 114. The current transaction being scrutinized 302 has a start time at t5 and no commit time. By comparing timestamp 300 with the start time of transaction 302, database server instance 106 determines the load start time of t15 is after the transaction start time t5, so the transaction 302 is an active straddling transaction.

Although the data items for the block 170 were up-to-date as of the load start time (t15), an IMC 114 containing these data items may not be up-to-date after commit of transaction 302. The in-memory private journal 130 is unable to account for any modifying transaction data that occurred before IMC generation started, and thus, the private journal cannot push the aggregate changes to the global journal 132. If this transaction 302 changes any data items in the block, the changes made by the transaction 302 are not included in the corresponding SMU 116 or journals 110, 112 because the transaction started before these in-memory structures were created.

SMU 116 will be missing in-journal indications regarding transaction 302, so the block 170 is recorded as invalid at bit 304 in the corresponding SMU 116. Because the block is marked as invalid, the corresponding rows are also effectively marked invalid in the row-level invalidity bitmap 308.

When the IMC 114 is read for a DML statement, the node will read from the block level bitmap 306 that the rows are invalid and that there is no updating information in the corresponding global journal 112 or private journal 110 from the in-journal bit map 310. For node 102, rows for block 170 will be read from disk 160. If block 170 was cached in a buffer cache 118, the rows could be read from the buffer cache 118 instead.

Committed Straddling Transaction Example

FIG. 3B is a block diagram illustrating a transaction with a start time before the load start time and a commit time after the load start time. Assume this transaction list 320 is scanned by node 142 after loading R1C3 and R2C3 and generating IMC 154. The transaction 322 has a start time at t5 and a commit time of t20. By comparing the timestamp 300 with the start and commit times of transaction 322, database server instance 146 determines the load start time of t15 is between the start time (t5) and the commit time (t20), so the transaction 322 is a committed straddling transaction.

The changes made by the straddling transaction 322 are not included in the corresponding SMU 156, private journal 150, or global journal 152 because these in-memory data structures did not exist at the time the transaction started.

SMU 156 will be missing in-journal indications resulting from transaction 322, so block 170 is recorded as invalid at bit 324 in the corresponding SMU 156. Because the block is marked as invalid, the corresponding rows are also effectively marked invalid in the row-level invalidity bitmap 328.

When the IMC 154 is read for a DML statement, the node will read from the block level bitmap 326 that the data items R1C3, R2C3 are invalid and that there is no updating information in the corresponding global journal 152 from the in-journal bit map 330. For node 142, rows for block 170 will be read from disk 160. If block 170 was cached in a buffer cache 158, the rows could be read from the buffer cache 158 instead.

Maintaining a Cached List of Straddling Transactions

According to one embodiment, once a straddling transaction has been identified, an identifier of the transaction is stored in a cached list of straddling transactions. Maintaining the cached list of straddling transaction is useful because the same straddling transaction may have updated many blocks in the to-be-loaded chunk. When the first such block is encountered, the system will check the cached list, determine that the transaction is not on the list, and then incur the overhead associated with determining that the transaction is a straddling transaction. When all subsequent blocks that were touched by the transaction are encountered, checking the cached list will indicate that the transaction is a straddling transaction, so the overhead associated with determining whether the transaction is straddling transaction is avoided.

Invalidating Data Items of Suspect Blocks in the IMC

In response to determining that a block that is being loaded into an IMC is a suspect block (i.e. a block that was touched by a straddling transaction), data items from the block that are loaded into the IMC are marked as invalid. Having been marked as invalid, transactions reading data from the IMC will obtain those data items elsewhere (e.g. in-memory journals, buffer cache, or from disk). By only allowing transactions to read data items from the IMC that have not been invalidated, the database server ensures that all transactions making use of the IMC will see (a) all changes committed as of the load start time of the IMC, and (b) no changes committed after the load start time of the IMC.

The manner in which data items are marked as invalid may vary from implementation to implementation. For example, the database server may maintain in volatile memory a list of those blocks that have been invalidated. As another example, the database server may maintain in volatile memory a bitmap in which each bit corresponds to a data item, and the value of the bit indicates whether the corresponding data item has been invalidated. As yet another example, within the IMC, each data item may have a "validity bit" whose value indicates whether the data item is valid. There are merely examples of the numerous ways to keep track of which data items within an IMC have been invalidated.

Fine-Granularity Invalidation

In the embodiments described above, the database server keeps track of which transactions performed which updates on a per-block basis, and all data items in a block touched by a straddling transaction are marked as invalid in the IMC. However, in systems where the database server keeps track of which transactions performed which updates with finer granularity, the invalidation may also be performed at finer granularity.

For example, in a system that keeps track of which rows, within a block, were updated by which transactions, the database server determines which rows, within the block, were updated by straddling transactions. Once those rows are identified, only data items from those rows are invalidated in the IMC.

Repopulating IMCs Using Data Already in Volatile Memory

Over time, the number of invalid data items within an IMC will increase. The higher the number of invalid data items within an IMC, the less efficient use of the IMC becomes. For example, if 90% of an IMC is invalid, then the database server incurs the overhead of checking the IMC, while still having to incur the overhead of obtaining the desired data items from elsewhere 90% of the time. In some embodiments, when a threshold amount of data in an IMC becomes stale, the node automatically triggers a repopulation operation.

Repopulating an IMC involves creating a new IMC, for the same chunk as an existing IMC (the "old IMC"), that reflects the state of the data as of a more recent point in time. A new IMC can be created in exactly the same manner as the old IMC. However, to reduce the overhead of creating the new IMC, techniques are described hereafter for taking advantage of the fact that some of the data items needed for the new IMC may already reside in volatile memory.

A node may be configured to repopulate an IMC according to sequential reloading or double buffer reloading. Sequential reloading includes invalidating the previous IMC, SMU, Global Journal entries and Private Journal entries, and then recreating these data structures in a sequential process. Embodiments that use sequential reloading conserve volatile memory at the expense of temporarily losing the benefit of an IMC. Double Buffering reloading includes recreating the data structures first, and then invalidating the previous IMC, SMU, global journal entries, and private journal entries. The old IMC continues to be maintained in memory, and made available to transactions, while the new IMC is being created. These embodiments provide use of the old IMC while the new IMC is loading at the expense of using more volatile memory. In some embodiments, a brief locking period of a chunk may be required for switching from an old IMC to the new IMC.

Loading Data from an Old IMC

Figure 5A:
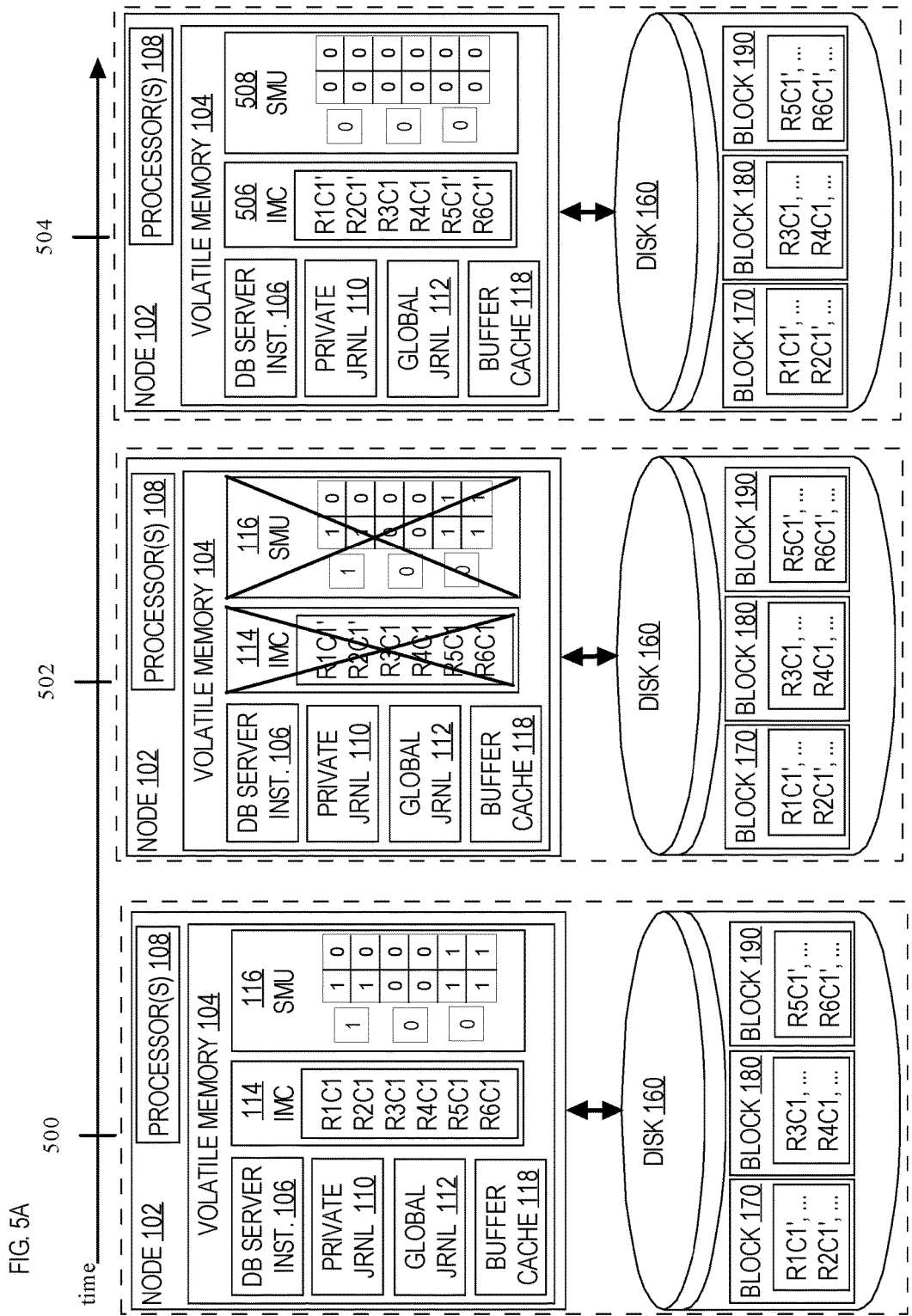
FIG. 5A is a block diagram illustrating sequential reloading of an IMC to repopulate stale data located in the IMC.

In some embodiments, repopulating an IMC may be performed by reading all non-invalidated blocks from an old IMC into a new IMC. FIG. 5A is a block diagram illustrating how a database server instance repopulates an IMC. Data items from IMC 114 may be used to create IMC 506.

Before copying data items from the old IMC, the instance consults the associated SMU to determine valid rows. Only valid rows or rows updatable with a corresponding global journal may be used to create the new IMC. For example:

Data items R1C1', R2C1' are loaded into the new IMC 506 from disk 160; the data items were invalidated due to a straddling transaction and are not available in the corresponding global journal 112 or the previous IMC 114

Data items R3C1, R4C1 are loaded into the new IMC 506 using the old IMC 114

Data items R5C1', R6C1' are loaded into the new IMC 506 using the old IMC 114 and the associated updates from global journal 112

Handling Queries During Repopulate

Figure 5B:
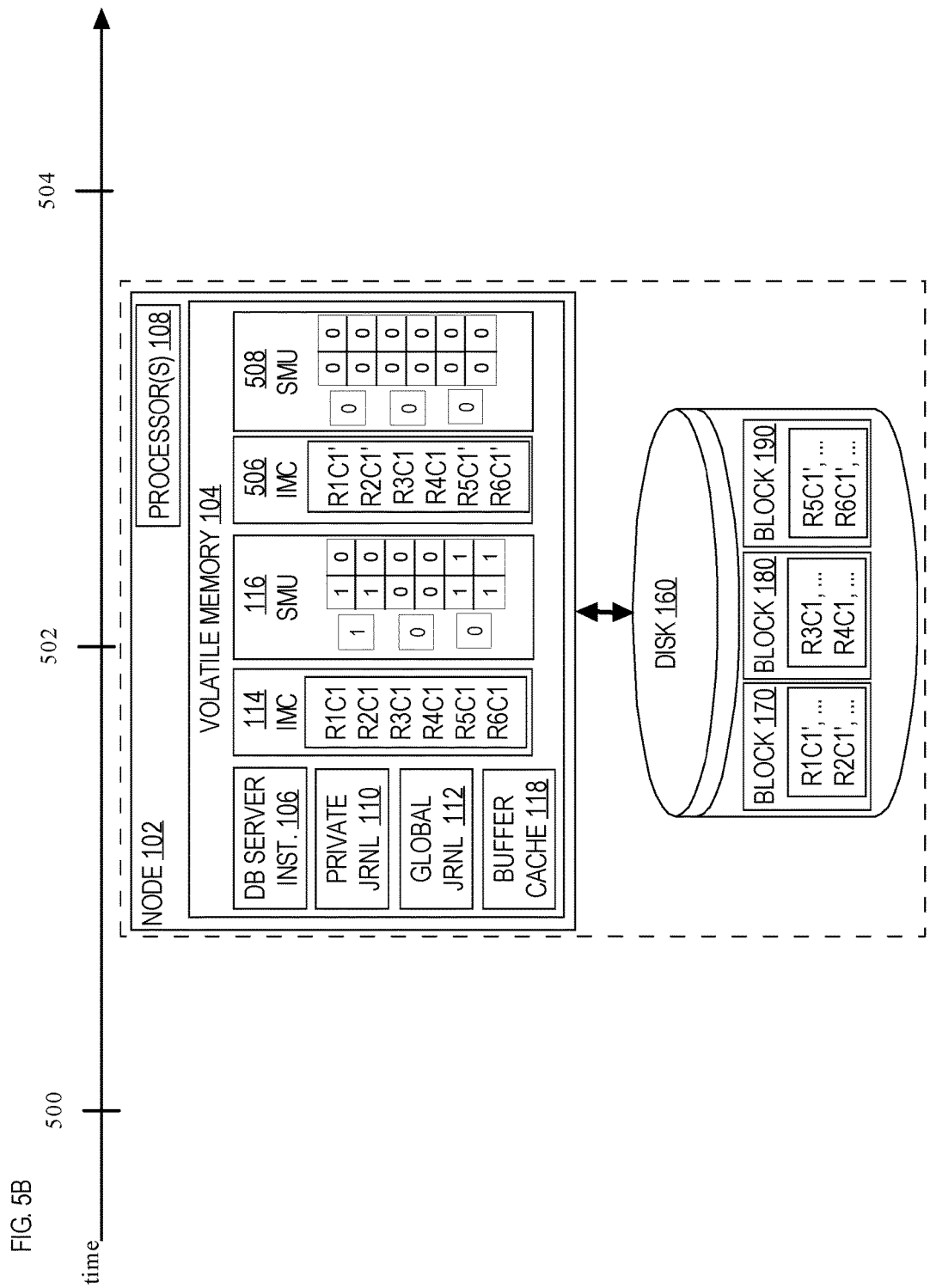
FIG. 5B is a block diagram illustrating double buffer reloading of an IMC to repopulate stale data located in the IMC.

Other than loading data from old IMCs, repopulating an in-memory data structure uses similar steps to creating an in-memory data structure. However, how each node accesses data for query execution during the process of creating the IMC is different in the sequential loading process and the double buffering process. FIGS. 5A & 5B illustrate the difference. At time 500 and 504, the two processes provide data in the same manner. However, at time 502 the two processes have different in-memory structures available, so data is provided through different resources.

Query Execution During Sequential Reloading

As presented in FIG. 5A, database server instance 106 provides data for query execution during sequential reloading by accessing data from disk for one portion of the process. At time 500, node 102 has an IMC 114 with some stale data. The database server instance 106 provides the most current data items R1C1', R2C1', R3C1, R4C1, R5C1', R6C1' using mostly in-memory resources:

After reviewing SMU 116, database server instance 106 provides R1C1', R2C1' by reading them from disk 160 because these data items were invalidated by a straddling transaction After reviewing SMU 116, database server instance 106 provides R3C1, R4C1 by reading them from IMC 114

After reviewing SMU 116, database server instance 106 provides R5C1', R6C1' by reading them from global journal 112.

At time 502, the IMC 114 and SMU 116 are invalidated. All reading is performed against data from disk 160.

Database server instance 106 reads R1C1', R2C1' from disk 160

Database server instance 106 reads R3C1, R4C1 from disk 160

Database server instance 106 reads R5C1', R6C1' from disk 160

In some embodiments, work for a query may be performed against data in buffer cache 118. In these embodiments, a version of the necessary data must reside in or be transferred to buffer cache 118 that has a state that is current as of the query execution time. If this condition is met then, data may be read from buffer cache 118 at time 502 without the overhead of accessing disk 160.

At time 504, the IMC 114 and SMU 116 are recreated with a new load start time as IMC 506 and SMU 508, respectively. The data structures have been updated with the latest data, so the database server instance 106 may provide the most current data items by reading the local IMC 506.

After reviewing SMU 508, database server instance 106 reads R1C1', R2C1' from IMC 506

After reviewing SMU 508, database server instance 106 reads R3C1, R4C1 from IMC 506

After reviewing SMU 508, database server instance 106 reads R5C1', R6C1' from IMC 506

Query Execution During Double Buffering Reloading

In some embodiments, an old IMC is maintained in memory while a new IMC is being created. These embodiments, provide use of the old IMC while the new IMC is loading at the expense of using more volatile memory. FIG. 5B is a block diagram illustrating double buffering reload of IMCs at time 502. The old IMC 114 and SMU 116 are maintained until the new IMC 506 and SMU 508 can be used. At time 504, the IMC 114 and SMU 116 are invalidated, but until then:

Database server instance 106 reads R1C1', R2C1' from disk 160

Database server instance 106 reads R3C1, R4C1 from IMC 114

Database server instance 106 reads R5C1, R6C1 from IMC 114 and updates the block using global journal 112 to get R5C1', R6C1'

Handling Queries

IMCs 114, 134 and 154 are only useful if used to improve the performance of queries that access table 164. Therefore, according to one embodiment, a database server instance in cluster 100 respond to a query that targets data from table 164 by breaking the operation requested by the query into work granules, and distributing those granules based on which node/database server instance is hosting the targeted data.

Figure 4:
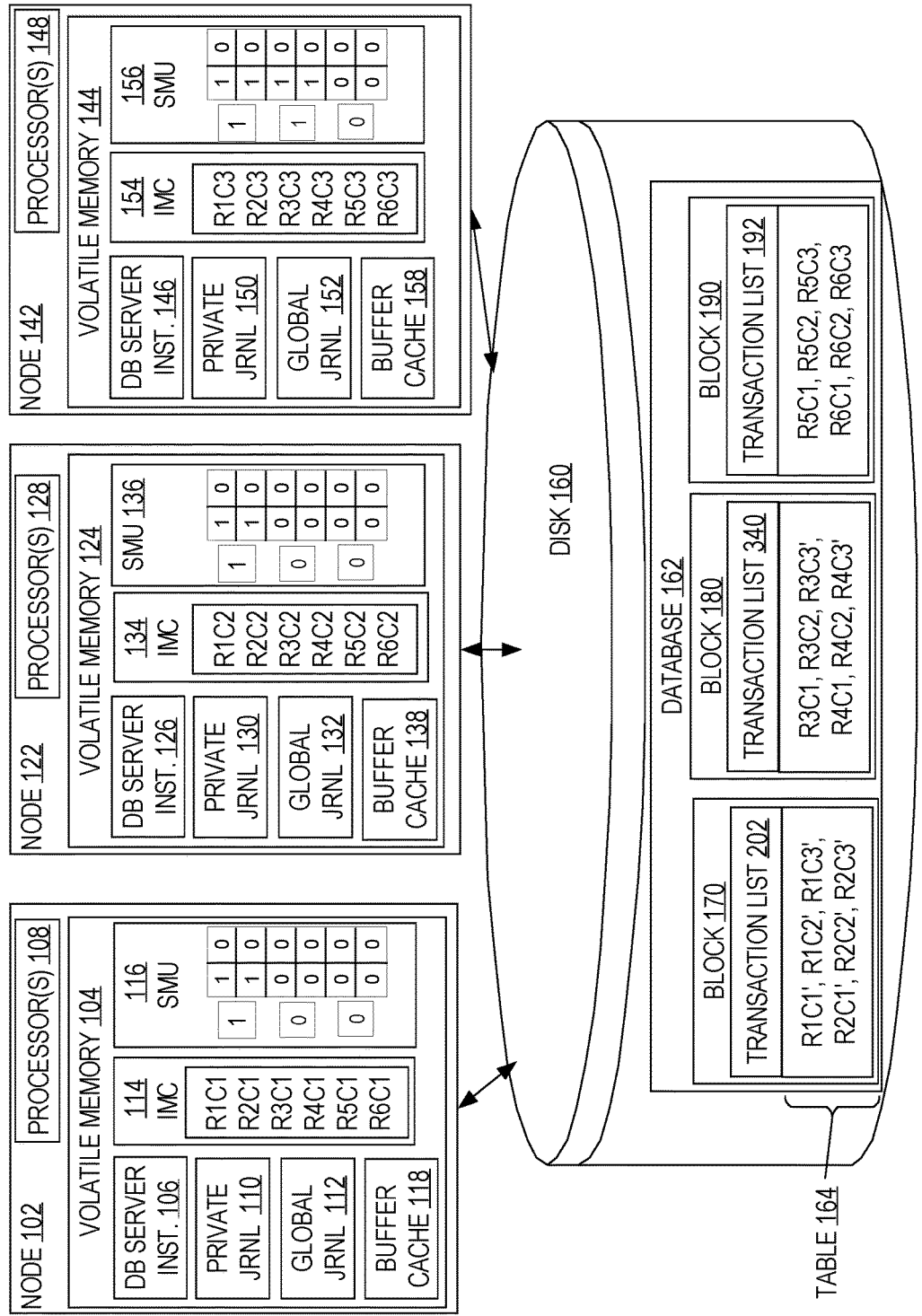
FIG. 4 is a block diagram illustrating a database cluster maintaining in-memory copies of a database object distributed across the volatile memories of a database cluster.

FIG. 4 is a block diagram illustrating a database system maintaining in-memory copies of a database object. Assume that database server instance 106 receives a query to scan an entire table 164. In response, database server instance 106 creates a first set of one or more work granules to scan the data that resides in IMC 114, a second set of one or more work granules to scan the data that resides in IMC 134, and a third set of one or more work granules to scan data that resides in IMC 154.

Each node executes the work granules assigned to it, taking advantage of its local in-memory copy of the data items that it is hosting. For any data items that cannot be read in the local IMC because they are marked as invalid in the corresponding local SMU, the database server instance retrieves that data from a local buffer cache if possible or from disk if a useful version of the data is not located in a local buffer cache. For example, R1C1' and R2C1' are marked as invalid in SMU 116 referring to IMC 114, so these data items would be read from local buffer cache 118 if a version of the data resides in buffer cache 118 that is current as of the query execution time. Alternatively, the data items may be read from block 170 on disk 160. Each node 102, 122, 142 then provides its results back to the node that received the query, and that node provides the results back to the database application that issued the query.

Non-Blocking DDLs

Similar to DMLs not being blocked during the load operation, DMLs likewise are not blocked by DDLs. In some embodiments, a DDL transaction causes the IMCs to repopulate. While the in-memory structures are repopulating, DMLs may continue to be committed. Then upon finishing creating the new in-memory data structures resulting from a DDL, straddling DML transactions are determined and any affected blocks are invalidated in the corresponding SMUs.

In embodiments that load data from an old IMC, if a DML transaction is accessing an old IMC before a DDL starts, then that data is not valid in the new IMC. Using sequential reloading, the old IMC would be invalidated before the DML commits. Thus, upon commit the in-memory journals do not record the committed changes because the data has already been marked as invalid. Using double buffering reloading, the old in-memory structures may be maintained for as long as an active DML transaction exists that started before the load start time of the new in-memory structures. However, the node creating the new IMCs still marks the data items as invalid in the corresponding SMU because creating the new IMC uses the straddling transaction identification mechanisms previously described. The database server can switch from the old in-memory structures to the new in-memory structures in an instance once the new in-memory structures are finished.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
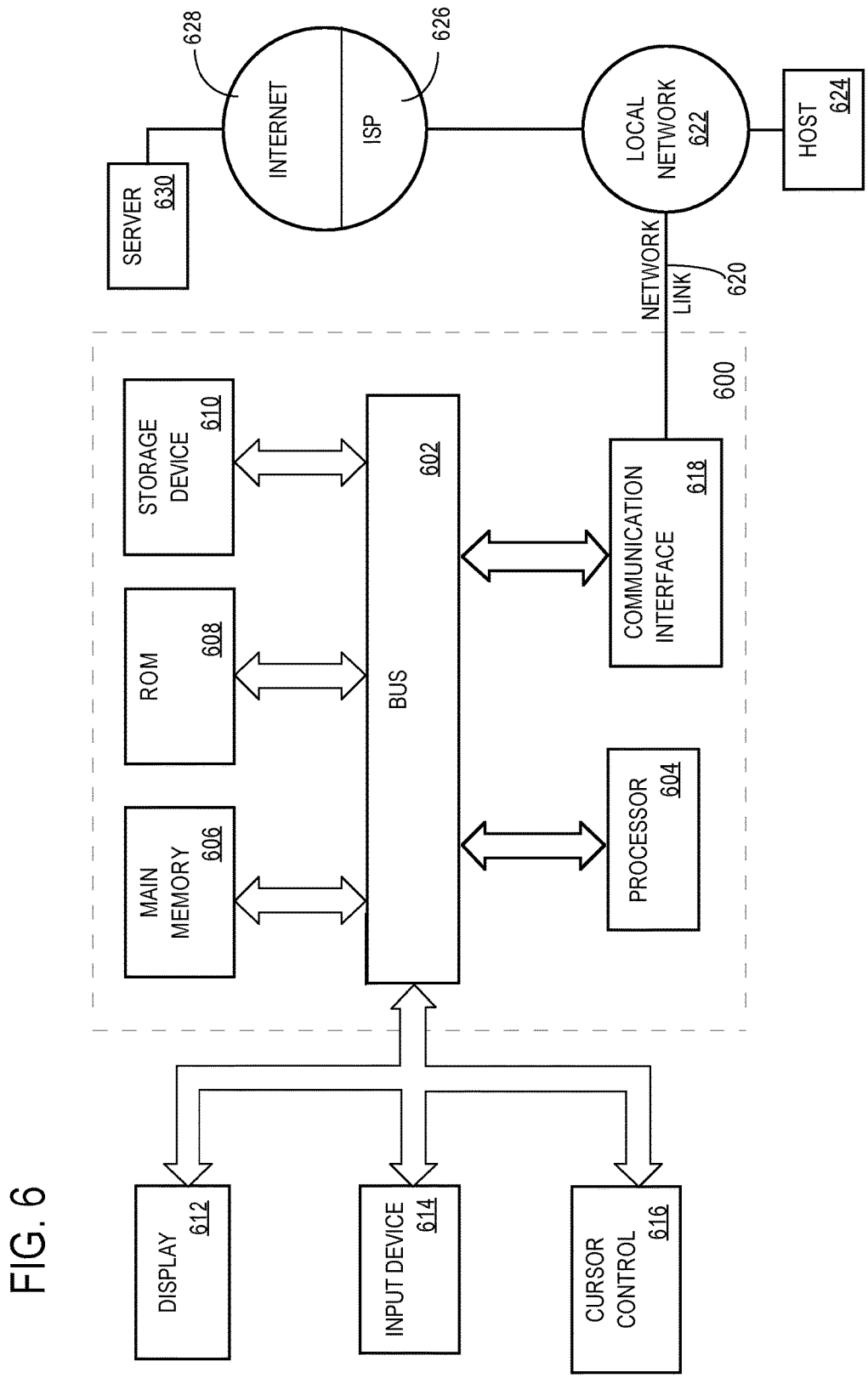
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
assigning a timestamp to an operation for making an in-memory copy of a chunk of a database object;
after assigning the timestamp, performing the operation without blocking updates to data items that belong in the chunk;
identifying a straddling transaction that:
affected a particular data item from the chunk,
started before the timestamp, and
had not committed before the timestamp; and
prior to allowing access to the in-memory copy of the chunk, storing data that indicates that the particular data item within the in-memory copy is invalid;
wherein the method is performed by one or more computing devices.

2. The method of claim 1,
wherein the particular data item is from a block that includes a set of one or more data items that belong to the chunk; and
wherein the data that indicates that the particular data item within the in-memory copy is invalid includes data that indicates the block is invalid.

3. The method of claim 1,
wherein the particular data item is from a row that includes a set of one or more data items that belong to the chunk; and
wherein the data that indicates that the particular data item within the in-memory copy is invalid includes data that indicates the row is invalid.

4. The method of claim 1,
wherein the particular data item is from a block comprising:
a set of one or more data items, and
a set of transaction information for the set of one or more data items; and
wherein identifying the straddling transaction includes scanning the set of transaction information.

5. The method of claim 1,
wherein the one or more computing devices comprise at least a first computing device and a second computing device;
the method further comprising:
sending a message, from the first computing device to the second computing device, to write any dirty buffers for the database object to disk; and
receiving, from second computing device to the first computing device, an acknowledgement message before loading data from the chunk into an in-memory copy of the chunk.

6. The method of claim 1,
wherein the one or more computing devices comprise at least a first computing device and a second computing device;
the method further comprising:
at the first computing device, receiving a plurality of locks for performing the operation;
at the first computing device, determining whether any lock from the plurality of locks is global;
after determining a particular lock of the plurality of locks is global,
sending, from the first computing device to the second computing device, a message to write to disk any dirty buffers containing at least a portion of the database object; and
receiving, from the second computing device to the first computing device, an acknowledgement message before loading data from disk into the in-memory copy of the chunk.

7. The method of claim 1, wherein:
the particular data item along with at least one other data item that belongs to the chunk are located in a buffer cache; and
the in-memory copy of the chunk is at least partially made from the particular data item and the at least one other data item in the buffer cache when performing the operation.

8. The method of claim 1,
wherein the particular data item along with at least one other data item that belongs to the chunk are located in a version of a block located in a buffer cache;
the method further comprising:
comparing the timestamp of the operation to the version of the block located in the buffer cache;
wherein the in-memory copy of the chunk is at least partially made by loading the particular data item along with the at least one other data item from disk.

9. The method of claim 1, wherein the straddling transaction is a transaction that committed after the timestamp.

10. The method of claim 1, wherein identifying the straddling transaction includes identifying a block that could have been affected by a possible straddling transaction, wherein the block that could have been affected by the possible straddling transaction has each transaction in a transaction list a start time that occurred after the timestamp.

11. The method of claim 1, wherein the making the in-memory copy of the chunk of the database object is in response to a DDL operation.

12. A method comprising:
creating a first in-memory copy of a chunk with a first timestamp;
repopulating the first in-memory copy of the chunk by creating a second in-memory copy of the chunk with a second timestamp;
identifying a straddling transaction that:
affected a particular data item from the chunk,
started before the second timestamp, and
had not committed before the second timestamp; and
prior to allowing access to the second in-memory copy of the chunk, storing data that indicates that the particular data item within the second in-memory copy is invalid;
wherein the method is performed by one or more computing devices.

13. The method of claim 12, wherein creating the second in-memory copy of the chunk includes: copying any valid data items from the first in-memory copy into the second in-memory copy.

14. The method of claim 12, the method further comprising:
maintaining the first in-memory copy while creating the second in-memory copy;
switching from maintaining the first in-memory copy to maintaining the second in-memory copy after storing data that indicates that the particular data item within the second in-memory copy is invalid.

15. One or more non-transitory computer-readable media storing instructions, wherein the instructions include:
instructions which, when executed by one or more hardware processors, cause assigning a timestamp to an operation for making an in-memory copy of a chunk of a database object;
instructions which, when executed by the one or more hardware processors, cause, after assigning the timestamp, performing the operation without blocking updates to data items that belong in the chunk;
instructions which, when executed by the one or more hardware processors, cause, identifying a straddling transaction that:
affected a particular data item from the chunk,
started before the timestamp, and
had not committed before the timestamp; and
instructions which, when executed by the one or more hardware processors, cause, prior to allowing access to the in-memory copy of the chunk, storing data that indicates that the particular data item within the in-memory copy is invalid.

16. The one or more non-transitory computer-readable media of claim 15,
wherein the particular data item is from a block that includes a set of one or more data items that belong to the chunk; and
wherein the data that indicates that the particular data item within the in-memory copy is invalid includes data that indicates the block is invalid.

17. The one or more non-transitory computer-readable media of claim 15, wherein the particular data item is from a row that includes a set of one or more data items that belong to the chunk; and wherein the data that indicates that the particular data item within the in-memory copy is invalid includes data that indicates the row is invalid.

18. The one or more non-transitory computer-readable media of claim 15,
wherein the particular data item is from a block comprising:
a set of one or more data items, and
a set of transaction information for the set of one or more data items; and
wherein identifying the straddling transaction includes scanning the set of transaction information.

19. The one or more non-transitory computer-readable media of claim 15,
wherein the instructions execute on at least a first computing device and a second computing device;
wherein the instructions further include:
instructions which, when executed by the one or more hardware processors, cause sending a message, from the first computing device to the second computing device, to write any dirty buffers for the database object to disk; and
instructions which, when executed by the one or more hardware processors, cause receiving, from second computing device to the first computing device, an acknowledgement message before loading data from the chunk into an in-memory copy of the chunk.

20. The one or more non-transitory computer-readable media of claim 15,
wherein the instructions execute on at least a first computing device and a second computing device;
wherein the instructions further include:
instructions which, when executed by the one or more hardware processors, cause, at the first computing device, receiving a plurality of locks for performing the operation;
instructions which, when executed by the one or more hardware processors, cause, at the first computing device, determining whether any lock from the plurality of locks is global;
instructions which, when executed by the one or more hardware processors, cause, after determining a particular lock of the plurality of locks is global,
sending, from the first computing device to the second computing device, a message to write to disk any dirty buffers containing at least a portion of the database object; and
receiving, from the second computing device to the first computing device, an acknowledgement message before loading data from disk into the in-memory copy of the chunk.

21. The one or more non-transitory computer-readable media of claim 15, wherein:
the particular data item along with at least one other data item that belongs to the chunk are located in a buffer cache; and
the in-memory copy of the chunk is at least partially made from the particular data item and the at least one other data item in the buffer cache when performing the operation.

22. The one or more non-transitory computer-readable media of claim 15,
wherein the particular data item along with at least one other data item that belongs to the chunk are located in a version of a block located in a buffer cache;
wherein the instructions further include:
instructions which, when executed by the one or more hardware processors, cause comparing the timestamp of the operation to the version of the block located in the buffer cache;
wherein the in-memory copy of the chunk is at least partially made from the loading the particular data item along with the at least one other data item from disk.

23. The one or more non-transitory computer-readable media of claim 15, wherein the straddling transaction includes transactions that committed after the timestamp.

24. The one or more non-transitory computer-readable media of claim 15, wherein identifying the straddling transaction includes identifying a block that could have been affected by a possible straddling transaction, wherein the block that could have been affected by the possible straddling transaction has each transaction in a transaction list a start time that occurred after the timestamp.

25. The one or more non-transitory computer-readable media of claim 15, wherein the making the in-memory copy of the chunk of the database object is in response to a DDL operation.

26. One or more non-transitory computer-readable media storing instructions, wherein the instructions include:
instructions which, when executed by one or more hardware processors, cause creating a first in-memory copy of a chunk with a first timestamp;
instructions which, when executed by the one or more hardware processors, cause repopulating the first in-memory copy of the chunk by creating a second in-memory copy of the chunk with a second timestamp;
instructions which, when executed by the one or more hardware processors, cause identifying a straddling transaction that:
affected a particular data item from the chunk,
started before the second timestamp, and
had not committed before the second timestamp; and
instructions which, when executed by the one or more hardware processors, cause, prior to allowing access to the second in-memory copy of the chunk, storing data that indicates that the particular data item within the second in-memory copy is invalid.

27. The one or more non-transitory computer-readable media of claim 26, wherein the instructions that cause creating the second in-memory copy of the chunk further include instructions that, when executed by the one or more hardware processors, cause copying any valid data items from the first in-memory copy into the second in-memory copy.

28. The one or more non-transitory computer-readable media of claim 26 storing instructions, wherein the instructions further include:
instructions which, when executed by the one or more hardware processors, cause maintaining the first in-memory copy while creating the second in-memory copy;
instructions which, when executed by one or more hardware processors, cause switching from maintaining the first in-memory copy to maintaining the second in-memory copy after storing data that indicates that the particular data item within the second in-memory copy is invalid.

* * * * *

UNITED STATES PATENT AND TRADEMARK OFFICE
CERTIFICATE OF CORRECTION

| | | |
|---|---|---|
| PATENT NO. | : 10,067,974 B2 | Page 1 of 1 |
| APPLICATION NO. | : 14/983481 | |
| DATED | : September 4, 2018 | |
| INVENTOR(S) | : Sanket Hase et al. | |

It is certified that error appears in the above-identified patent and that said Letters Patent is hereby corrected as shown below:

In the Claims

Column 22
Claim 11: Line 7: Delete "wherein the making" and insert --wherein making--.

Column 24
Claim 25: Line 23: Delete "wherein the making" and insert --wherein making--.

Signed and Sealed this
Second Day of October, 2018

Andrei Iancu
*Director of the United States Patent and Trademark Office*